US012602624B2

(12) United States Patent
Jeyashekar et al.

(10) Patent No.: US 12,602,624 B2
(45) Date of Patent: Apr. 14, 2026

(54) ANOMALY DETECTION METHOD FOR MODEL OUTPUTS

(71) Applicant: Citibank, N.A., New York, NY (US)

(72) Inventors: Nigil Satish Jeyashekar, Irving, TX (US); Miriam Silver, Tel Aviv (IL); James Myers, New York, NY (US); Payal Jain, London (GB); Tariq Husayn Maonah, London (GB); Mariusz Saternus, Cracow (PL); Daniel Lewandowski, Cracow (PL); Biraj Krushna Rath, London (GB); Stuart Murray, London (GB); Philip Davies, London (GB)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 19/196,702

(22) Filed: May 1, 2025

(65) Prior Publication Data

US 2025/0259115 A1     Aug. 14, 2025

Related U.S. Application Data

(63) Continuation-in-part of application No. 19/061,982, filed on Feb. 24, 2025, and a continuation-in-part of
(Continued)

(51) Int. Cl.
*G06N 20/20* (2019.01)
(52) U.S. Cl.
CPC .................................... *G06N 20/20* (2019.01)
(58) Field of Classification Search
CPC ...................................................... G06N 20/20
(Continued)

(56) References Cited

U.S. PATENT DOCUMENTS

| | | | |
|---|---|---|---|
| 5,423,041 A | 6/1995 | Burke et al. | |
| 5,586,218 A | 12/1996 | Allen | |

(Continued)

FOREIGN PATENT DOCUMENTS

| | | |
|---|---|---|
| CN | 106502890 A | 3/2017 |
| WO | 2021160499 A1 | 8/2021 |

(Continued)

OTHER PUBLICATIONS

Schlegl, et al., "f-AnoGAN: Fast unsupervised anomaly detection with generative adversarial networks", Medical Image Analysis 54 (2019) 30-44, 2019 (Year: 2019).*
(Continued)

*Primary Examiner* — Tsu-Chang Lee
(74) *Attorney, Agent, or Firm* — Perkins Coie LLP

(57) ABSTRACT

Systems and methods for detecting anomalies in generative outputs are disclosed herein. The system receives a user prompt indicating a request for data over a time period. The system inputs, into a model, the user prompt to cause the model to generate an output based on the user prompt. The system then generates the first tokens based on the output. To generate the second tokens, the system retrieves, based on the user prompt, sources relating to the data requested by the user prompt. The system then generates queries to request, from the sources, the data over the time period and generates the second tokens based on the retrieved data. The system then performs a comparison of the first tokens and the second tokens and accepts or rejects the output of the model based on the comparison.

20 Claims, 8 Drawing Sheets

Related U.S. Application Data application No. 19/038,662, filed on Jan. 27, 2025, and a continuation-in-part of application No. 18/951, 120, filed on Nov. 18, 2024, and a continuation-in-part of application No. PCT/US2024/051150, filed on Oct. 11, 2024, and a continuation-in-part of application No. 18/907,414, filed on Oct. 4, 2024, said application No. 19/061,982 is a continuation-in-part of application No. 18/781,965, filed on Jul. 23, 2024, now Pat. No. 12,271,720, said application No. PCT/US2024/051150 is a continuation of application No. 18/781,965, filed on Jul. 23, 2024, now Pat. No. 12,271,720, and a continuation of application No. 18/781,977, filed on Jul. 23, 2024, now Pat. No. 12,210,858, said application No. 19/038,662 is a continuation of application No. 18/781,985, filed on Jul. 23, 2024, now Pat. No. 12,210,949, said application No. PCT/US2024/051150 is a continuation of application No. 18/781,985, filed on Jul. 23, 2024, now Pat. No. 12,210,949, and a continuation of application No. 18/669,421, filed on May 20, 2024, now Pat. No. 12,182,539, said application No. 18/907,414 is a continuation of application No. 18/661,532, filed on May 10, 2024, now Pat. No. 12,111,747, which is a continuation-in-part of application No. 18/661,519, filed on May 10, 2024, now Pat. No. 12,106,205, said application No. 18/951,120 is a continuation of application No. 18/633,293, filed on Apr. 11, 2024, now Pat. No. 12,147,513, said application No. 18/661,519 is a continuation-in-part of application No. 18/633,293, filed on Apr. 11, 2024, now Pat. No. 12,147,513, said application No. 18/781,965 is a continuation-in-part of application No. 18/535,001, filed on Dec. 11, 2023, now Pat. No. 12,045,610, said application No. PCT/US2024/051150 is a continuation of application No. 18/535,001, filed on Dec. 11, 2023, now Pat. No. 12,045,610, said application No. 18/781,985 is a continuation-in-part of application No. 18/535,001, filed on Dec. 11, 2023, now Pat. No. 12,045,610.

(58) Field of Classification Search
USPC .......................................................... 706/12
See application file for complete search history.

(56) References Cited

U.S. PATENT DOCUMENTS

| | | | |
|---|---|---|---|
| 5,671,361 | A | 9/1997 | Brown et al. |
| 6,169,981 | B1 | 1/2001 | Werbos |
| 6,208,720 | B1 | 3/2001 | Curtis et al. |
| 6,473,748 | B1 | 10/2002 | Archer |
| 6,546,545 | B1 | 4/2003 | Honarvar et al. |
| 6,587,846 | B1 | 7/2003 | Lamuth |
| 7,313,552 | B2 | 12/2007 | Lorenz et al. |
| 7,669,133 | B2 | 2/2010 | Chikirivao et al. |
| 7,822,621 | B1 | 10/2010 | Chappel |
| 7,984,513 | B1 | 7/2011 | Kyne et al. |
| 8,380,817 | B2 | 2/2013 | Okada |
| 8,387,020 | B1 | 2/2013 | Maclachlan et al. |
| 8,572,552 | B2 | 10/2013 | Kennaley |
| 8,656,343 | B2 | 2/2014 | Fox et al. |
| 8,930,298 | B2 | 1/2015 | Demuth et al. |
| 9,020,872 | B2 | 4/2015 | Junker |
| 9,215,212 | B2 | 12/2015 | Reddy et al. |
| 9,251,466 | B2 | 2/2016 | Rajesh |
| 9,842,045 | B2 | 12/2017 | Heorhiadi et al. |
| 9,858,828 | B1 | 1/2018 | Fuka |
| 10,157,355 | B2 | 12/2018 | Johnson et al. |
| 10,276,170 | B2 | 4/2019 | Gruber et al. |
| 10,438,212 | B1 | 10/2019 | Jilani et al. |
| 10,554,738 | B1 | 2/2020 | Ren |
| 10,607,141 | B2 | 3/2020 | Jerram et al. |
| 10,620,988 | B2 | 4/2020 | Lauderdale et al. |
| 10,755,103 | B2 | 8/2020 | Chang et al. |
| 10,764,150 | B1 | 9/2020 | Hermoni et al. |
| 10,943,067 | B1 | 3/2021 | Brown et al. |
| 10,949,337 | B1 | 3/2021 | Yalla et al. |
| 10,951,485 | B1 | 3/2021 | Hermoni et al. |
| 11,042,647 | B1 | 6/2021 | Joyce et al. |
| 11,074,107 | B1 | 7/2021 | Nandakumar |
| 11,106,801 | B1 | 8/2021 | Levine et al. |
| 11,133,942 | B1 | 9/2021 | Griffin |
| 11,153,177 | B1 | 10/2021 | Hermoni et al. |
| 11,164,078 | B2 | 11/2021 | Jin et al. |
| 11,227,047 | B1 | 1/2022 | Vashisht et al. |
| 11,227,187 | B1 | 1/2022 | Weinberger |
| 11,271,822 | B1 | 3/2022 | Hermoni et al. |
| 11,315,196 | B1 | 4/2022 | Narayan et al. |
| 11,328,068 | B1 | 5/2022 | Niedzwiedz et al. |
| 11,410,136 | B2 | 8/2022 | Cook et al. |
| 11,436,777 | B1 | 9/2022 | Karli et al. |
| 11,470,106 | B1 | 10/2022 | Lin et al. |
| 11,481,553 | B1 | 10/2022 | Durvasula et al. |
| 11,503,075 | B1 | 11/2022 | Sirianni et al. |
| 11,516,222 | B1 | 11/2022 | Srinivasan et al. |
| 11,531,943 | B1 | 12/2022 | Kumar |
| 11,562,078 | B2 | 1/2023 | Sabourin et al. |
| 11,573,848 | B2 | 2/2023 | Linck et al. |
| 11,586,436 | B1 | 2/2023 | Jennings |
| 11,593,390 | B2 | 2/2023 | Sundel |
| 11,652,839 | B1 | 5/2023 | Aloisio et al. |
| 11,656,852 | B2 | 5/2023 | Mazurskiy |
| 11,663,409 | B2 | 5/2023 | Terry et al. |
| 11,663,662 | B2 | 5/2023 | Chen et al. |
| 11,676,685 | B2 | 6/2023 | Jaganathan et al. |
| 11,681,610 | B2 | 6/2023 | Chang et al. |
| 11,681,811 | B1 | 6/2023 | Dixit |
| 11,683,333 | B1 | 6/2023 | Dominessy et al. |
| 11,706,241 | B1 | 7/2023 | Cross et al. |
| 11,709,757 | B1 | 7/2023 | Kurian et al. |
| 11,720,686 | B1 | 8/2023 | Cross et al. |
| 11,734,418 | B1 | 8/2023 | Epstein |
| 11,734,591 | B2 | 8/2023 | Turner et al. |
| 11,741,226 | B2 | 8/2023 | Dixit |
| 11,750,717 | B2 | 9/2023 | Walsh et al. |
| 11,765,100 | B1 | 9/2023 | Sloane et al. |
| 11,803,792 | B2 | 10/2023 | Makhija et al. |
| 11,811,730 | B1 | 11/2023 | Kandasamy et al. |
| 11,823,108 | B1 | 11/2023 | Bradbury et al. |
| 11,842,408 | B1 | 12/2023 | Martinez et al. |
| 11,853,735 | B1 | 12/2023 | Choudhury et al. |
| 11,874,934 | B1 | 1/2024 | Rao et al. |
| 11,875,123 | B1 | 1/2024 | Ben David et al. |
| 11,875,130 | B1 | 1/2024 | Bosnjakovic et al. |
| 11,915,152 | B2 | 2/2024 | Baker |
| 11,924,027 | B1 | 3/2024 | Mysore et al. |
| 11,947,435 | B2 | 4/2024 | Boulineau et al. |
| 11,960,515 | B1 | 4/2024 | Pallakonda et al. |
| 11,983,806 | B1 | 5/2024 | Ramesh et al. |
| 11,990,139 | B1 | 5/2024 | Sandrew |
| 11,995,412 | B1 | 5/2024 | Mishra |
| 12,001,463 | B1 | 6/2024 | Pallakonda et al. |
| 12,007,963 | B1 | 6/2024 | Rajagopalan et al. |
| 12,026,599 | B1 | 7/2024 | Lewis, II et al. |
| 12,028,368 | B1 | 7/2024 | Cohen et al. |
| 12,088,611 | B1 * | 9/2024 | Lin ......................... H04L 63/20 |
| 12,094,010 | B1 | 9/2024 | Hampapur et al. |
| 12,106,205 | B1 | 10/2024 | Jain et al. |
| 12,111,747 | B1 | 10/2024 | Jain et al. |
| 12,131,819 | B1 | 10/2024 | Murray et al. |
| 12,135,949 | B1 | 11/2024 | Cameron et al. |
| 12,147,513 | B1 | 11/2024 | Jain et al. |
| 12,149,553 | B1 | 11/2024 | Fly et al. |
| 12,149,558 | B1 | 11/2024 | Brown et al. |
| 12,155,781 | B1 | 11/2024 | Helfgott et al. |
| 12,182,258 | B2 | 12/2024 | Stokes, III et al. |
| 2003/0007178 | A1 | 1/2003 | Jeyachandran et al. |

(56) References Cited

U.S. PATENT DOCUMENTS

| | | |
|---|---|---|
| 2004/0098454 A1 | 5/2004 | Trapp et al. |
| 2005/0204348 A1 | 9/2005 | Horning et al. |
| 2006/0095918 A1 | 5/2006 | Hirose |
| 2007/0067848 A1 | 3/2007 | Gustave et al. |
| 2010/0275263 A1 | 10/2010 | Bennett et al. |
| 2010/0313189 A1 | 12/2010 | Beretta et al. |
| 2014/0137257 A1 | 5/2014 | Martinez et al. |
| 2014/0258998 A1 | 9/2014 | Adl-Tabatabai et al. |
| 2017/0061132 A1 | 3/2017 | Hovor et al. |
| 2017/0262164 A1 | 9/2017 | Jain et al. |
| 2017/0279826 A1 | 9/2017 | Mohanty et al. |
| 2017/0295197 A1 | 10/2017 | Parimi et al. |
| 2018/0020021 A1 | 1/2018 | Gilmore et al. |
| 2018/0239903 A1 | 8/2018 | Bodin et al. |
| 2018/0343114 A1 | 11/2018 | Ben-Ari |
| 2019/0188706 A1 | 6/2019 | McCurtis |
| 2019/0236661 A1 | 8/2019 | Hogg et al. |
| 2019/0286816 A1 | 9/2019 | Fu |
| 2020/0012493 A1 | 1/2020 | Sagy |
| 2020/0043164 A1 | 2/2020 | Fuchs et al. |
| 2020/0074470 A1 | 3/2020 | Deshpande et al. |
| 2020/0133711 A1 | 4/2020 | Webster et al. |
| 2020/0153855 A1 | 5/2020 | Kirti et al. |
| 2020/0219009 A1 | 7/2020 | Dao et al. |
| 2020/0233979 A1 | 7/2020 | Tahmasebi Maraghoosh et al. |
| 2020/0259852 A1 | 8/2020 | Wolff et al. |
| 2020/0309767 A1 | 10/2020 | Loo et al. |
| 2020/0314191 A1 | 10/2020 | Madhavan et al. |
| 2020/0334326 A1 | 10/2020 | Zhang et al. |
| 2020/0349054 A1 | 11/2020 | Dai et al. |
| 2020/0380118 A1 | 12/2020 | Miller et al. |
| 2020/0387608 A1 | 12/2020 | Miller et al. |
| 2021/0012486 A1 | 1/2021 | Huang et al. |
| 2021/0049288 A1 | 2/2021 | Li |
| 2021/0089941 A1 | 3/2021 | Chen et al. |
| 2021/0133182 A1 | 5/2021 | Anderson et al. |
| 2021/0173935 A1 | 6/2021 | Ramasamy et al. |
| 2021/0185094 A1 | 6/2021 | Waplington et al. |
| 2021/0211431 A1 | 7/2021 | Albero et al. |
| 2021/0256125 A1 | 8/2021 | Miller et al. |
| 2021/0264547 A1 | 8/2021 | Li |
| 2021/0273957 A1 | 9/2021 | Boyer et al. |
| 2021/0390465 A1 | 12/2021 | Werder et al. |
| 2022/0050928 A1 | 2/2022 | Shukla et al. |
| 2022/0114251 A1 | 4/2022 | Guim Bernat et al. |
| 2022/0114399 A1 | 4/2022 | Castiglione et al. |
| 2022/0147636 A1 | 5/2022 | Mahuli et al. |
| 2022/0179906 A1 | 6/2022 | Desai et al. |
| 2022/0198304 A1 | 6/2022 | Szczepanik et al. |
| 2022/0263843 A1 | 8/2022 | Aslam et al. |
| 2022/0263855 A1 | 8/2022 | Engelberg et al. |
| 2022/0263860 A1 | 8/2022 | Crabtree et al. |
| 2022/0278889 A1 | 9/2022 | Malleshaiah et al. |
| 2022/0286438 A1 | 9/2022 | Burke, Jr. et al. |
| 2022/0286474 A1 | 9/2022 | Kuppa et al. |
| 2022/0294789 A1 | 9/2022 | Tikhomirov et al. |
| 2022/0294810 A1 | 9/2022 | Tyagi et al. |
| 2022/0303300 A1 | 9/2022 | Egan |
| 2022/0303302 A1 | 9/2022 | Hwang et al. |
| 2022/0303352 A1 | 9/2022 | Herzog et al. |
| 2022/0311681 A1 | 9/2022 | Palladino et al. |
| 2022/0318654 A1 | 10/2022 | Lin et al. |
| 2022/0327620 A1 | 10/2022 | Ndoutoumou |
| 2022/0334818 A1 | 10/2022 | McFarland, Jr. |
| 2022/0342846 A1 | 10/2022 | Kunchakarra et al. |
| 2022/0345457 A1 | 10/2022 | Jeffords et al. |
| 2022/0358023 A1 | 11/2022 | Moser et al. |
| 2022/0366140 A1 | 11/2022 | Saito et al. |
| 2022/0368728 A1 | 11/2022 | Murray et al. |
| 2022/0377093 A1 | 11/2022 | Crabtree et al. |
| 2022/0398149 A1 | 12/2022 | McFarland, Jr. et al. |
| 2022/0400135 A1 | 12/2022 | Gamra |
| 2022/0414213 A1 | 12/2022 | Dixit |
| 2022/0414536 A1 | 12/2022 | M L et al. |
| 2022/0417274 A1 | 12/2022 | Madanahalli et al. |

| | | |
|---|---|---|
| 2023/0007039 A1 | 1/2023 | Waplington |
| 2023/0009999 A1 | 1/2023 | Higuchi et al. |
| 2023/0019072 A1 | 1/2023 | Okunlola |
| 2023/0032686 A1 | 2/2023 | Williams et al. |
| 2023/0033317 A1 | 2/2023 | Lin et al. |
| 2023/0035321 A1 | 2/2023 | Vijayaraghavan |
| 2023/0039855 A1 | 2/2023 | Greene, Jr. |
| 2023/0044102 A1 | 2/2023 | Anderson et al. |
| 2023/0052608 A1 | 2/2023 | Wattiau et al. |
| 2023/0067128 A1 | 3/2023 | Engelberg et al. |
| 2023/0071264 A1 | 3/2023 | Hakala et al. |
| 2023/0076372 A1 | 3/2023 | Engelberg et al. |
| 2023/0077527 A1 | 3/2023 | Sarkar |
| 2023/0109021 A1 | 4/2023 | Curtin et al. |
| 2023/0113621 A1 | 4/2023 | Griffin et al. |
| 2023/0114719 A1 | 4/2023 | Thomas et al. |
| 2023/0117962 A1 | 4/2023 | Kaimal et al. |
| 2023/0118388 A1 | 4/2023 | Crabtree et al. |
| 2023/0123314 A1 | 4/2023 | Crabtree et al. |
| 2023/0132703 A1 | 5/2023 | Marsenic et al. |
| 2023/0135660 A1 | 5/2023 | Chapman et al. |
| 2023/0148116 A1 | 5/2023 | Stokes, III et al. |
| 2023/0164158 A1 | 5/2023 | Fellows et al. |
| 2023/0169397 A1 | 6/2023 | Smith et al. |
| 2023/0171282 A1 | 6/2023 | Bollinger, III |
| 2023/0177441 A1 | 6/2023 | Durvasula et al. |
| 2023/0177613 A1 | 6/2023 | Crabtree et al. |
| 2023/0205888 A1 | 6/2023 | Tyagi et al. |
| 2023/0205891 A1 | 6/2023 | Yellapragada et al. |
| 2023/0208869 A1 | 6/2023 | Bisht et al. |
| 2023/0208870 A1 | 6/2023 | Yellapragada et al. |
| 2023/0208871 A1 | 6/2023 | Yellapragada et al. |
| 2023/0229542 A1 | 7/2023 | Watkins et al. |
| 2023/0252393 A1 | 8/2023 | Orzechowski et al. |
| 2023/0259860 A1 | 8/2023 | Sarkar |
| 2023/0269272 A1 | 8/2023 | Dambrot et al. |
| 2023/0274003 A1 | 8/2023 | Liu et al. |
| 2023/0359789 A1 | 11/2023 | Andre et al. |
| 2023/0362200 A1 | 11/2023 | Crabtree et al. |
| 2023/0396641 A1 | 12/2023 | Hebbagodi et al. |
| 2023/0412635 A1 | 12/2023 | Binyamini et al. |
| 2024/0012734 A1 | 1/2024 | Lee et al. |
| 2024/0020538 A1 | 1/2024 | Socher et al. |
| 2024/0054233 A1 | 2/2024 | Ohayon et al. |
| 2024/0054249 A1 | 2/2024 | Loubet Moundi et al. |
| 2024/0095077 A1 | 3/2024 | Singh et al. |
| 2024/0129345 A1 | 4/2024 | Kassam et al. |
| 2024/0202442 A1 | 6/2024 | Saito et al. |
| 2024/0256678 A1 | 8/2024 | Thompson |
| 2024/0364749 A1 | 10/2024 | Crabtree et al. |
| 2024/0403428 A1 | 12/2024 | Lal et al. |
| 2024/0403437 A1 | 12/2024 | Szigeti et al. |
| 2024/0403445 A1 | 12/2024 | Straub et al. |
| 2024/0406145 A1 | 12/2024 | Crabtree et al. |
| 2024/0411896 A1 | 12/2024 | Myers et al. |
| 2024/0414211 A1 | 12/2024 | Boyer et al. |

FOREIGN PATENT DOCUMENTS

| | | |
|---|---|---|
| WO | 2022125803 A1 | 6/2022 |
| WO | 2024020416 A1 | 1/2024 |

OTHER PUBLICATIONS

Geiger, et al., "TadGAN: Time series anomaly detection using generative adversarial networks", 2020 IEEE International Conference on Big Data, 2020 (Year: 2020).*

Li, et al., "Anomaly detection with generative adversarial networks for multivariate time series" arXiv: 1809.04758V3 [cs.LG] Jan. 15, 2019 (Year: 2019).*

Behravesh et al, "Rule Modeling Engine for Optimizing Complex Event Processing Patterns", IEEE, pp. 128-135 (Year: 2009).

Burnashev et al, "Design and Implementation of Integrated Development Environment for Building Rule-Based Expert Systems", IEEE, pp. 1-4 (Year: 2020).

Cranium, Adopt & Accelerate AI Safely, retrieved on Nov. 7, 2024, from https://cranium.ai/.

(56) References Cited

OTHER PUBLICATIONS

Cuadrado et al, "An Autonomous Engine for Services Configuration and Deployment", IEEE, pp. 520-536 (Year: 2012).

"Empower Your Team with a Compliance Co-Pilot", Sedric, retrieved on Sep. 25, 2024. https://www.sedric.ai/.

Fickas, "Design Issues in a Rule-Based System", ACM, pp. 208-215 (Year: 1985).

Ge et al, "Automatic Generation of Rule-based Software Configuration Management Systems", ACM, pp. 659 (Year: 2005).

Generative machine learning models; IPCCOM000272835D, Aug. 17, 2023. (Year: 2023).

Genesis et al "CI Ref: A Tool for Visualizing the Historical Data of Software Refactorings in Java Projects", ACM, pp. 174-179 (Year: 2023).

Guana et al, "Backward Propagation of Code Refinements on Transformational Code Generation Environments", IEEE, pp. 55-60 ( Year: 2013).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Halvonik et al, "Large Language Models and Rule-Based Approaches in Domain-Specific Communication", IEEE, pp. 107046-107058 (Year: 2024).

Hu, Q., J., et al., "Routerbench: A Benchmark for Multi-LLM Routing System," arXiv:2403.12031 v2 [cs.LG] Mar. 28, 2024, 16 pages.

Huang et al, "AI Coding: Learning to Construct Error Correction Codes", IEEE, pp. 26-39 (Year: 2020).

Idrizi "Exploring the Role of Explainable Artificial Intelligence(XAI) in Adaptive learning systems", ACM, pp. 100-105 (Year: 2024).

International Search Report and Written Opinion received in Application No. PCT/US24/47571, dated Dec. 9, 2024, 10 pages.

Jiang et al, "Self-Planning Code Generation with Large Language Models", ACM, pp. 1-30 (Year: 2024).

Kibria et al, "Big Data Analytics, Machine Learning, andArtificial Intelligence in Next-Generation Wireless Networks", IEEE, pp. 32328-32338 (Year: 2018).

Kumar et al, "A Rule-based Recommendation System for Selection of Software Development Life Cycle Models", ACM, pp. 1-6 ( Year: 2013).

Langley et al, "Applications of Machine Learning and Rule Induction", ACM, pp. 54-64 (Year: 1995).

Mezini, Programming and Execution Models for Next Generation Code Intelligence Systems (Keynote), ACM, pp. 1-2 (Year: 2021).

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Peers, M., "What California AI Bill Could Mean," The Briefing, published and retrieved Aug. 30, 2024, 8 pages, https://www.theinformation.com/articles/what-california-ai-bill-could-mean.

Rattanasawad et al, "A Review and Comparison of Rule Languages and Rule-based Inference Engines for the Semantic Web", IEEE, pp. 1-6 (Year: 2013).

Soares et al, "Explaining Deep Learning Models Through Rule-Based Approximation and Visualization", IEEE, pp. 2399-2407 (Year: 2021).

Sottara et al., "Enhancing A Production Rule Engine with Predictive Models Using PMML", ACM, pp. 39-47 (Year: 2011).

Sun et al, "Efficient Rule Engine for Smart Building Systems", IEEE, pp. 1658-1669 (Year: 2015).

Vartak et al."MODELDB: A System for Machine Learning Model Management", ACM, pp. 1-3 (Year: 2016).

Vereschak et al, "Trust in AI-assisted Decision Making: Perspectives from Those Behind the System and Those for Whom the Decision is Made", ACM, pp. 1-14 (Year: 2024).

Verma et al, "Integration of Rule based and Case based Reasoning System to Support Decision Making", IEEE, pp. 106-108 (Year: 2014).

Wang et al, "Design and realization of distributed Rule Engine for scene linkage of Internet of Things", IEEE, pp. 396-401 (Year: 2024).

Zhang et al, "Developing A Rule Engine for Automated Feature Recognition from CAD Models", IEEE, pp. 3925-3930 (Year: 2009).

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

AI Risk Management Framework NIST, retrieved on Jun. 17, 2024, https://www.nist.gov/itl/ai-risk-management-framework.

Independent analysis of AI language models and API providers. Artificial Analysis, retrieved on Jun. 13, 2024, https://artificialanalysis.ai/, 11 pages.

What is AI Verify?, AI Verify Foundation, Jun. 11, 2024, 3 pages, https://aiverifyfoundation.sg/.

Brown, D., et al., "The Great AI Challenge: We Test Five Top Bots on Useful, Everyday Skills," The Wall Street Journal, published May 25, 2024.

Dong, Y., et al., "Building Guardrails for Large Language Models," https://ar5iv.labs.arxiv.org/html/2402.01822v1, published May 29, 2024, 20 pages.

Futurism, "Sam Altman Admits That OpenAI Doesn't Actually Understand How Its AI Works", Jun. 11, 2024, 4 pages, https://futurism.com/sam-altman-admits-openai-understand-ai.

International Search Report and Written Opinion Received received in Application No. PCT/US23/85942, dated Feb. 15, 2024, 6 pages.

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Mathews, A. W., "What AI Can Do in Healthcare—and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

Mollick, E., "Latent Expertise: Everyone is in R&D," One Useful Thing, published on Jun. 20, 2024, https://www.oneusefulthing.org/p/latent-expertise-everyone-is-in-r.

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Zhao, H., et al., "Explainability for Large Language Models: A Survey," https://arxiv.org/abs/2309.01029, Nov. 28, 2024, 38 pages.

"Singapore launches Project Moonshot", a generative Artificial Intelligence testing toolkit to address LLM safety and security challenges, https://www.imda.gov.sg/resources/press-releases-factsheets-and-speeches/press-releases/2024/sg-launches-project-moonshot, May 31, 2024, 8 pages.

Aggarwal, Nitin, KPIs for gen AI: Why measuring your new AI is essential to its success, https://cloud.google.com/transform/kpis-for-gen-ai-why-measuring-your-new-ai-is-essential-to-its-success.

ANTHROP/C, Mapping the Mind of a Large Language Model, https://www.anthropic.com/research/mapping-mind-language-model, May 21, 2024.

Claburn, Thomas, OpenAI's GPT-4 can exploit real vulnerabilities by reading security advisories, The Register, https://www.theregister.com/2024/04/17/gpt4_can_exploit_real_vulnerabilities/?utm_source=tldrai, Apr. 17, 2024, 3 pages.

Marshall, Andrew, Threat Modeling AI/ML Systems and Dependencies, Nov. 2, 2022, 27 pages.

Roose, Kevin, "A.I. Has a Measurement Problem", The New York Times, Apr. 15, 2024, 5 pages.

Roose, Kevin, "A.I.'s Black Boxes Just Got a Little Less Mysterious", The New York Times, May 21, 2024, 5 pages.

Shah, Harshay, Decomposing and Editing Predictions by Modeling Model Computation, arXiv:2404.11534v1 [cs.LG] Apr. 17, 2024.

(56)  References Cited

OTHER PUBLICATIONS

Shankar, Ram, "Failure Modes in Machine Learning", Nov. 2019,
14 pages.

* cited by examiner

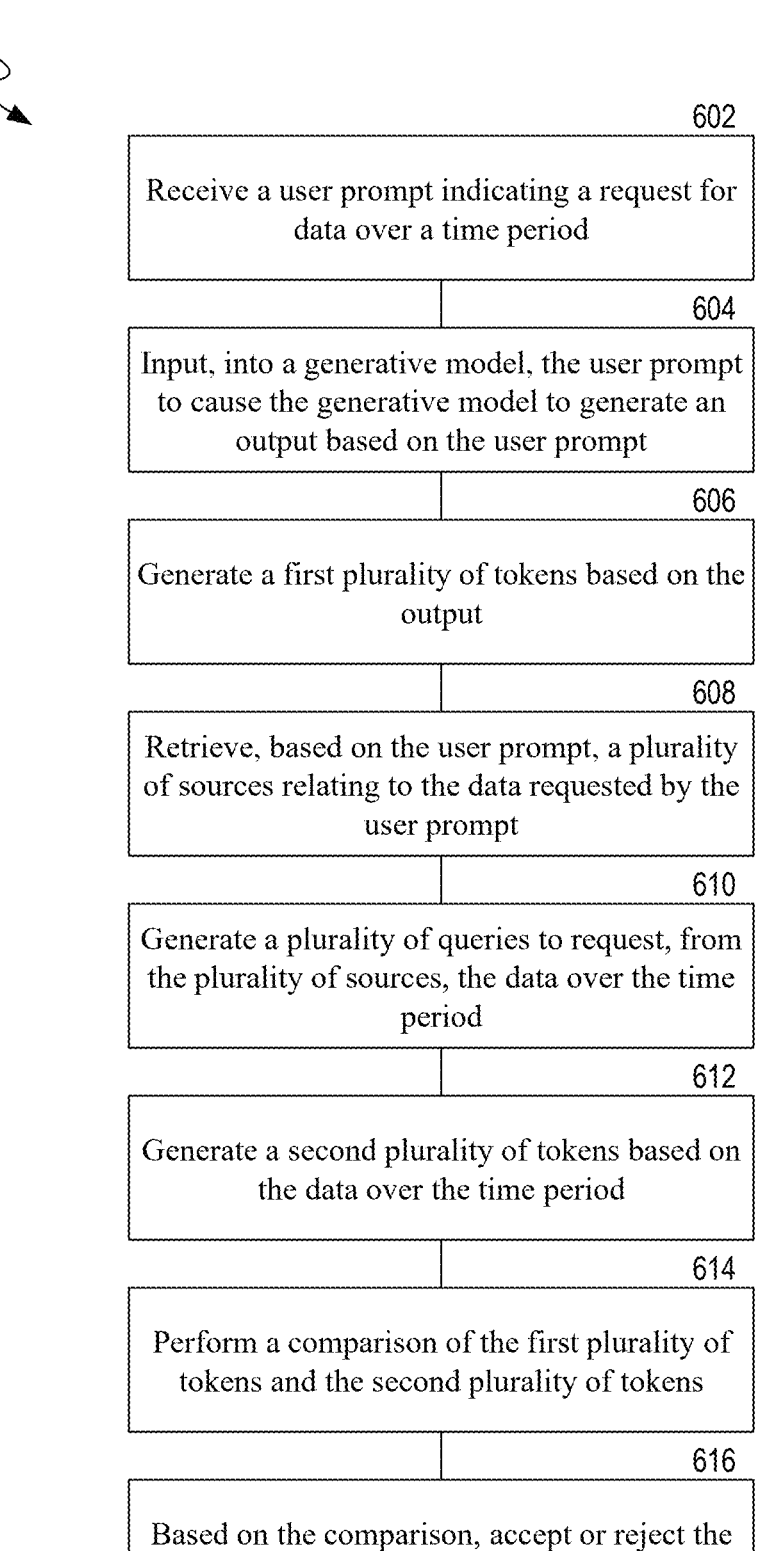

600

602

Receive a user prompt indicating a request for data over a time period

604

Input, into a generative model, the user prompt to cause the generative model to generate an output based on the user prompt

606

Generate a first plurality of tokens based on the output

608

Retrieve, based on the user prompt, a plurality of sources relating to the data requested by the user prompt

610

Generate a plurality of queries to request, from the plurality of sources, the data over the time period

612

Generate a second plurality of tokens based on the data over the time period

614

Perform a comparison of the first plurality of tokens and the second plurality of tokens

616

Based on the comparison, accept or reject the output of the generative model

FIG. 6

ANOMALY DETECTION METHOD FOR MODEL OUTPUTS

CROSS-REFERENCE TO RELATED APPLICATIONS

This application is a continuation-in-part of U.S. patent application Ser. No. 19/038,662, filed Jan. 27, 2025, entitled "SYSTEMS AND METHODS FOR DETECTING REQUIRED RULE ENGINE UPDATED USING ARTIFI-CIAL INTELLIGENCE MODELS," which is a continuation of U.S. patent application Ser. No. 18/781,985, filed Jul. 23, 2024, entitled "SYSTEMS AND METHODS FOR DETECTING REQUIRED RULE ENGINE UPDATED USING ARTIFICIAL INTELLIGENCE MODELS," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA." U.S. patent application Ser. No. 19/038,662 is further related to U.S. patent application Ser. No. 18/669,421, filed May 20, 2024, entitled "SYS-TEMS AND METHODS FOR MODIFYING DECISION ENGINES DURING SOFTWARE DEVELOPMENT USING VARIABLE DEPLOYMENT CRITERIA," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED MODEL PROXY MODELS WITH PREDEFINED MODEL DEPLOYMENT CRITERIA."

This application is further a continuation-in-part of U.S. patent application Ser. No. 19/061,982, filed Feb. 24, 2025, entitled "SYSTEMS AND METHODS FOR GENERAT-ING ARTIFICIAL INTELLIGENCE MODELS AND/OR RULE ENGINES WITHOUT REQUIRING TRAINING DATA THAT IS SPECIFIC TO MODEL COMPONENTS AND OBJECTIVES," which is a continuation-in-part of U.S. patent application Ser. No. 18/781,965, filed Jul. 23, 2024, entitled "SYSTEMS AND METHODS FOR DETECTING REQUIRED RULE ENGINE UPDATES USING ARTIFICIAL INTELLIGENCE MODELS," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA." U.S. patent application Ser. No. 19/061,982 is further related to U.S. patent application Ser. No. 19/038,662, filed Jan. 27, 2025, entitled "SYS-TEMS AND METHODS FOR DETECTING REQUIRED RULE ENGINE UPDATED USING ARTIFICIAL INTEL-LIGENCE MODELS," which is a continuation of U.S. patent application Ser. No. 18/781,985, filed Jul. 23, 2024, entitled "SYSTEMS AND METHODS FOR DETECTING REQUIRED RULE ENGINE UPDATED USING ARTIFI-CIAL INTELLIGENCE MODELS," which is a continua-tion-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MOD-ELS WITH PREDEFINED MODEL DEPLOYMENT CRI-TERIA." U.S. patent application Ser. No. 19/061,982 is further related to U.S. patent application Ser. No. 18/669, 421, filed May 20, 2024, entitled "SYSTEMS AND METH-ODS FOR MODIFYING DECISION ENGINES DURING SOFTWARE DEVELOPMENT USING VARIABLE DEPLOYMENT CRITERIA," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MOD-ELS WITH PREDEFINED MODEL DEPLOYMENT CRI-TERIA."

This application is further a continuation-in-part of Inter-national PCT Patent Application No. PCT/US2024/051150, filed Oct. 11, 2024, which claims the benefit of priority of U.S. patent application Ser. No. 18/669,421, filed May 20, 2024, entitled "SYSTEMS AND METHODS FOR MODI-FYING DECISION ENGINES DURING SOFTWARE DEVELOPMENT USING VARIABLE DEPLOYMENT CRITERIA," U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MOD-ELS WITH PREDEFINED MODEL DEPLOYMENT CRI-TERIA," U.S. patent application Ser. No. 18/781,965, filed Jul. 23, 2024, entitled "SYSTEMS AND METHODS FOR DETECTING REQUIRED RULE ENGINE UPDATES USING ARTIFICIAL INTELLIGENCE MODELS," U.S. patent application Ser. No. 18/781,977, filed Jul. 23, 2024, entitled "SYSTEMS AND METHODS FOR DETECTING REQUIRED RULE ENGINE UPDATED USING ARTIFI-CIAL INTELLIGENCE MODELS," and U.S. patent appli-cation Ser. No. 18/781,985, filed Jul. 23, 2024, entitled "SYSTEMS AND METHODS FOR DETECTING REQUIRED RULE ENGINE UPDATED USING ARTIFI-CIAL INTELLIGENCE MODELS."

This application is further a continuation-in-part of U.S. patent application Ser. No. 18/951,120, filed Nov. 18, 2024, entitled "DYNAMIC EVALUATION OF LANGUAGE MODEL PROMPTS FOR MODEL SELECTION AND OUTPUT VALIDATION AND METHODS AND SYS-TEMS OF THE SAME," which is a continuation of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYS-TEMS OF THE SAME."

This application is further a continuation-in-part of U.S. patent application Ser. No. 18/907,414, filed Oct. 4, 2024, entitled "DYNAMIC INPUT-SENSITIVE VALIDATION OF MACHINE LEARNING MODEL OUTPUTS AND METHODS AND SYSTEMS OF THE SAME," which is a continuation of U.S. patent application Ser. No. 18/661,532, filed May 10, 2024, entitled "DYNAMIC INPUT-SENSI-TIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELEC-TION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELEC-TION AND OUTPUT VALIDATION AND METHODS AND SYSTEMS OF THE SAME."

The content of the foregoing applications is incorporated herein by reference in its entirety.

BACKGROUND

Model outputs can include the results produced by a machine learning model after it has processed and analyzed input data. These outputs can vary widely depending on the type of machine learning task being performed. In the context of machine learning model outputs, an anomaly can refer to a result or data point that deviates significantly from an expected norm. Anomalies can arise due to various factors and can be difficult to detect.

BRIEF DESCRIPTION OF THE DRAWINGS

FIG. 6 is a flowchart of operations for detecting anomalies in model outputs, in accordance with one or more implementations of this disclosure.

Figure 1:
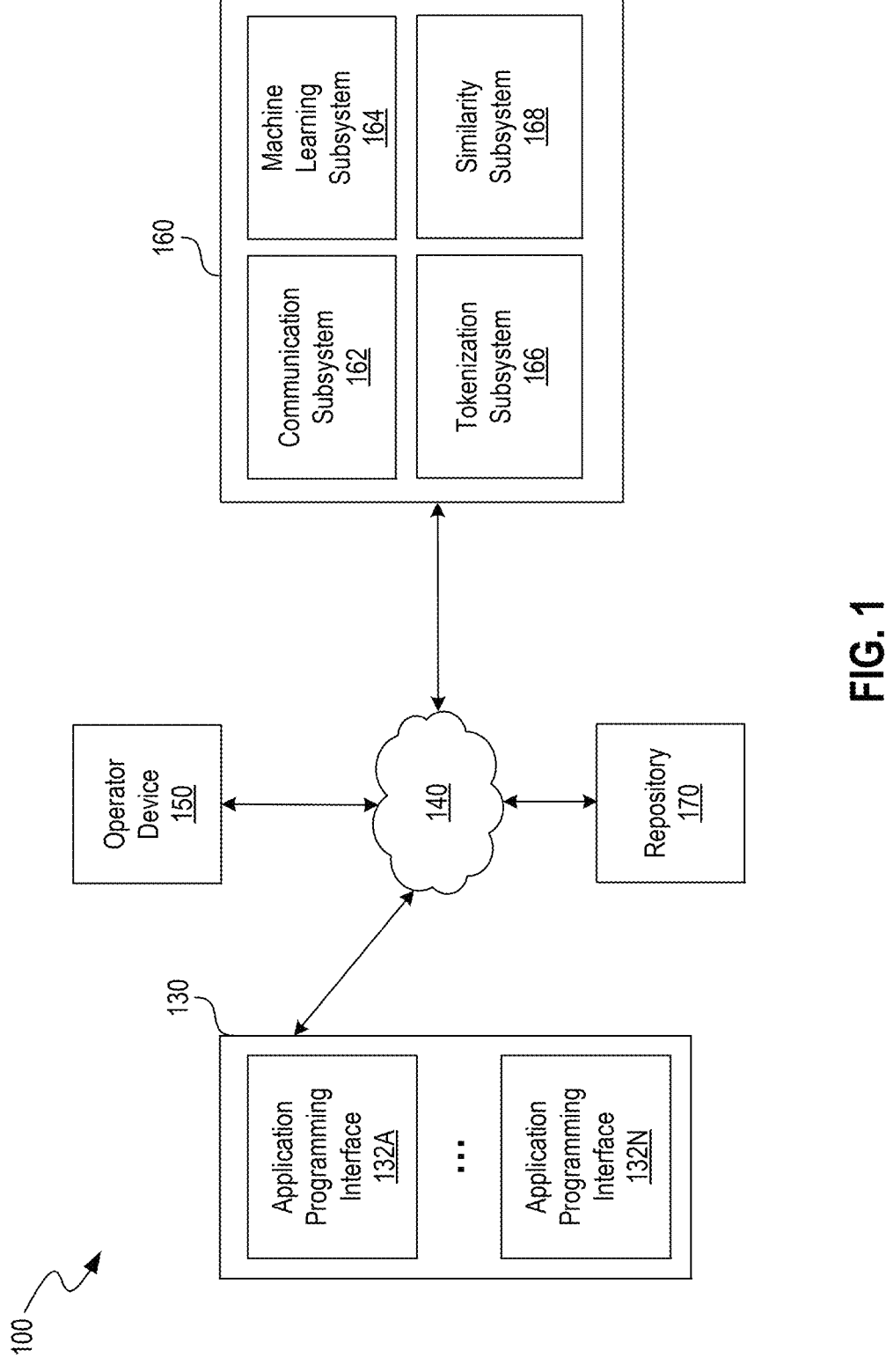
FIG. 1 shows an illustrative system for detecting anomalies in model outputs, in accordance with one or more implementations of this disclosure.

The technologies described herein will become more apparent to those skilled in the art from studying the Detailed Description in conjunction with the drawings. Implementations or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As the reliance on artificial intelligence (AI) models continues to grow, there are inherent risks associated with outputs from these models. Inaccurate outputs can affect outcomes and compromise safety and efficiency. Moreover, AI models are increasingly being used in critical decision-making processes across various domains. Making decisions based on erroneous or misrepresented information included in model outputs can lead to significant consequences. For example, incorrect predictions or classifications can result in substantial losses, regulatory penalties, and damage to an organization's reputation.

Anomalies in model outputs can result in many of these consequences. Anomalies can arise from various sources and can be difficult to detect. These anomalies can manifest as outliers, unexpected patterns, or deviations from the expected results, which can compromise the reliability and accuracy of the AI system. In some implementations, anomalies include hallucinations, which occur when an AI model generates information that appears plausible but is entirely fabricated or inaccurate. These hallucinations can mislead users into believing the generated content is factual. For example, a model produces a detailed and convincing response that includes non-existent references, incorrect data, or fictitious events. The risk of hallucinations is heightened when the model is prompted with ambiguous or incomplete information, leading it to fill in gaps with invented details.

To mitigate these risks, systems can implement controls to ensure the accuracy of information and to detect anomalous outputs generated using AI models. This can include techniques such as anomaly detection, which involves identifying and analyzing unusual patterns in the data that may indicate potential issues. This patent document discloses systems and methods to detect anomalies in outputs generated by AI models. The system generates two sets of tokens, based on (i) GenAI outputs and (ii) sources stored in a database, and performs a token comparison between the two sets for anomaly detection in the GenAI outputs. Conventional systems often rely on the outputs of AI models without reliable methods of detecting anomalies, hallucinations, or other errors in the outputs. Anomaly detection can prevent erroneous model outputs from causing outputs to fail if they do not sufficiently align with relevant data retrieved from reliable sources.

For example, a user can input a prompt into an AI model, where the prompt requests a report or a summary of analytics over a period of time. The AI model can then generate text-based and visual analytics based on the user prompt. These analytics can be passed through a text filter to obtain only text-based analytics. The text-based analytics from the AI model can then be tokenized for comparison against actual or true information from the sources used by the AI model. The sources of requested information specified in the user prompt can be retrieved separately. The text-based analytics from these retrieved sources can also be tokenized. These tokens, representing the actual or true information from the sources, can then be compared against the tokens generated based on the outputs of the AI model. This comparison can yield a match accuracy for token comparison, providing a pass or fail result for the AI model outputs. This process can serve as an anomaly detector for AI models across many different contexts, safeguarding against the use of erroneous outputs from these models.

In particular, the system can receive a request for information or data. The system can receive a user prompt indicating a request for information or data. In some implementations, the system receives a user prompt indicating a request for a report summarizing data over a time period. For example, a user prompt can be "Show the trend in the number of transactions for Firm-A in New York for 2024." The user prompt indicates a request for data on the number of transactions for Firm-A in New York over the time period of 2024. The system can use an AI model to generate a report summarizing the trend in the number of transactions for Firm-A in New York for 2024 and can use the methods discussed herein to detect anomalies in this output.

The system can generate two sets of tokens, which will be compared to detect any anomalies in the model output. For example, the system generates a first plurality of tokens using the AI model. The system can input, into an AI model, the user prompt to cause the AI model to generate an output based on the user prompt, the output comprising a plurality of text-based analytics and a plurality of visual analytics based on the user prompt. For example, the text-based analytics can include the number of transactions or Firm-A in New York at various points during 2024, while the visual analytics can include graphs or other images relating to this data. The system can apply a text filter to the output to generate a modified output including just the text-based analytics and excluding the visual analytics. The system can then generate the first plurality of tokens based on the text-based analytics.

The system then generates a second plurality of tokens based on the sources used by the AI model to determine the output. For example, the system retrieves, based on the user prompt, sources relating to the data requested by the user prompt. The system then generates queries to request, from the sources, the data over the time period. The system can generate the second plurality of tokens based on the data over the time period. This data, retrieved directly from the sources, is actual or true information against which the model outputs can be compared.

For example, the system can perform a comparison of the first plurality of tokens and the second plurality of tokens to determine a match accuracy. The system can use a number of techniques to assess the match accuracy between the first plurality of tokens and the second plurality of tokens. If the system determines that the match accuracy satisfies an anomaly detection threshold, the system can approve the output of the AI model. Approving the output can enable transmission of the report summarizing the data over the time period to the user. For example, the system can output a report summarizing the trend in the number of transactions for Firm-A in New York for 2024. If the match accuracy fails to satisfy the anomaly detection threshold, the system can reject the output of the AI model and refrain from outputting a report summarizing the trend in the number of transactions for Firm-A in New York for 2024.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 shows an illustrative system 100 for detecting anomalies in model outputs, in accordance with one or more implementations of this disclosure. For example, the system 100 can be used to compare outputs from AI models to verified information to detect anomalies in the outputs. In some implementations, the system 100 can utilize techniques such as applying text filters, parsing and tokenizing outputs, and performing similarity analyses in order to detect anomalies. For example, the system 100 can include an anomaly detection system 160 able to perform anomaly detection operations. The anomaly detection system 160 can include software, hardware, or a combination of the two. For example, the anomaly detection system 160 can be a physical server or a virtual server that is running on a physical computer system. In some implementations, the anomaly detection system 160 can be configured on a user device (e.g., a laptop computer, a smartphone, a desktop computer, an electronic tablet, or another suitable user device) and configured to execute instructions for detecting anomalies in model outputs. In particular, the anomaly detection system 160 can include several subsystems, each configured to perform one or more steps of the methods described herein, such as a communication subsystem 162, a machine learning subsystem 164, a tokenization subsystem 166, and a similarity subsystem 168.

As described herein, the anomaly detection system 160 can obtain data to determine whether an output is anomalous. The anomaly detection system 160 can retrieve data or sources of data from databases or data stores. As described herein, an anomaly detection system can be any system (e.g., computer, device, node, etc.) that is enabled to execute one or more tools for detecting anomalous outputs or enabled to execute tasks for which data can be passively collected. The anomaly detection system 160 can be configured to receive the data via a communication network 140 at the communication subsystem 162. The communication network 140 can be a local area network (LAN), a wide area network (WAN; e.g., the internet), or a combination of the two. The communication subsystem 162 can include software components, hardware components, or a combination of both. For example, the communication subsystem 162 can include a network card (e.g., a wireless network card or a wired network card) that is associated with software to drive the card. The communication subsystem 162 can pass at least a portion of the data, or a pointer to the data in memory, to other subsystems, such as the machine learning subsystem 164, the tokenization subsystem 166, and the similarity subsystem 168.

According to some implementations, the anomaly detection system 160 can obtain such data by generating one or more commands to execute anomaly detection operations. In some examples, the command(s) can specify a specific timeframe for obtaining the data (e.g., explicitly by identifying the timeframe via a start and an end time, or implicitly by requesting data from a current block of time). Additionally, the system 100 can include a repository 170, which can store historic data, stored data, machine learning model parameters, and system commands. In some implementations, the repository 170 can store preconfigured commands related to detecting anomalies in model outputs, which can be used by the anomaly detection system 160 to manage anomaly detection dynamically. The repository 170 can also include metadata or tags associated with stored data, such as identifiers, policies, or patterns. The anomaly detection system 160 can retrieve data from the repository 170 to refine its predictions, optimize outcomes, and improve the accuracy of anomaly detection. Additionally, the repository 170 can store augmented datasets used to update the machine learning model based on newly collected data, ensuring adaptive and evolving predictions.

The system 100 can further include an operator device 150, which can receive alerts generated by the anomaly detection system 160 when a potential anomalous output is detected. The operator device 150 can be a desktop computer, mobile device, or other suitable user interface (UI) through which an operator can review system notifications and monitor outcomes, such as flagged or blocked outputs. The anomaly detection system 160 can transmit natural language explanations to the operator device 150 to provide insight into anomalous outputs and system responses.

Figure 2:
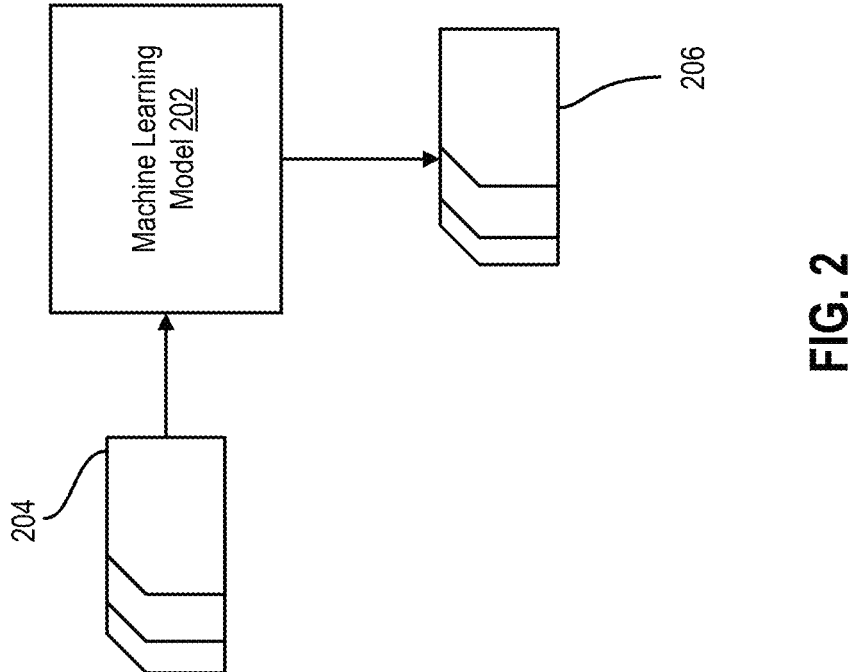
FIG. 2 illustrates an exemplary machine learning model, in accordance with one or more implementations of this disclosure.

FIG. 2 illustrates an exemplary machine learning model 202, in accordance with one or more implementations of this disclosure. The machine learning model 202 can be an AI model, such as a generative model, or another model. According to some examples, the machine learning model can be any model, such as a model for classification. In some implementations, the machine learning model 202 can be trained to intake input 204, including input data and requests received. As a result of inputting the input 204 into the machine learning model 202, the machine learning model 202 can then output an output 206. As described herein, the input data can include data such as requests or prompts. In particular, the machine learning model 202 can receive a user prompt indicating a request for a report summarizing data over a time period.

For example, the output 206 can include a plurality of text-based analytics and a plurality of visual analytics based on the user prompt. Furthermore, as described, the machine learning model 202 can be configured to output a confidence interval or other metric for certainty regarding the outputs. The machine learning model 202 can be trained on a training dataset containing a plurality of user prompts and labels, such as a degree and indication for security conditions that were identified by operators. For example, the machine learning model 202 is described in relation to FIG. 2 herein.

The output parameters can be fed back to the machine learning model 202 as input to train the machine learning model 202 (e.g., alone or in conjunction with user indications of the accuracy of outputs, labels associated with the inputs, or other reference feedback information). The machine learning model 202 can update its configurations (e.g., weights, biases, or other parameters) based on the assessment of its prediction and reference feedback information (e.g., user indication of accuracy, reference labels, or other information). Connection weights can be adjusted, for example, if the machine learning model 202 is a neural network to reconcile differences between the neural network's prediction and the reference feedback regarding conditions (e.g., anomalous behavior).

One or more neurons of the neural network can require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model can be trained to generate better predictions.

In some implementations, the machine learning model 202 can include an artificial neural network. In such implementations, the machine learning model 202 can include an input layer and one or more hidden layers. Each neural unit of the machine learning model 202 can be connected to one or more other neural units of the machine learning model 202. Such connections can be enforcing or inhibitory in their effect on the activation state of connected neural units. Each individual neural unit can have a summation function that combines the values of all of its inputs together. Each connection (or the neural unit itself) can have a threshold function that a signal must surpass before it propagates to other neural units. The machine learning model 202 can be self-learning or trained rather than explicitly programmed and can perform significantly better in certain areas of problem-solving as compared to computer programs that do not use machine learning. During training, an output layer of the machine learning model 202 can correspond to a classification of the machine learning model 202, and an input known to correspond to that classification can be input into an input layer of the machine learning model 202 during training. During testing, an input without a known classification can be input into the input layer, and a determined classification can be output.

The machine learning model 202 can include embedding layers in which each feature of a vector is converted into a dense vector representation. These dense vector representations for each feature can be pooled at one or more subsequent layers to convert the set of embedding vectors into a single vector. The machine learning model 202 can be structured as a factorization machine model. The machine learning model 202 can be a non-linear model or supervised learning model that can perform classification or regression. For example, the machine learning model 202 can be a general-purpose supervised learning algorithm that the anomaly detection system 160 uses for both classification and regression tasks. Alternatively, the machine learning model 202 can include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer"), and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks, and there can be more complex neural network designs that include feedback connections, skip connections, or other such possible connections between neurons or layers, which are not discussed in detail here.

A deep neural network (DNN) is a type of neural network that has multiple layers or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "machine learning-based model" or more simply "machine learning model" can be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset can be a collection of text documents, referred to as a "text corpus" (or simply referred to as a "corpus"). The corpus can represent a language domain (e.g., a single language), a subject domain (e.g., scientific papers), or can encompass another domain or domains, be they larger or smaller than a single language or subject domain. For example, a relatively large, multilingual, and non-subject-specific corpus can be created by extracting text from online webpages or publicly available social media posts. Training data can be annotated with ground truth labels (e.g., each data entry in the training dataset can be paired with a label) or can be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding machine learning model input (e.g., in the case of an autoencoder), or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model is typically to minimize a loss function or maximize a reward function.

The training data can be a subset of a larger data set. For example, a data set can be split into three mutually exclusive subsets: a training set, a validation (or cross-validation) set, and a testing set. The three subsets of data can be used sequentially during machine learning model training. For example, the training set can be first used to train one or more machine learning models, e.g., each machine learning model having a particular architecture, having a particular training procedure, being describable by a set of model hyperparameters, or otherwise being varied from the other of the one or more machine learning models. The validation (or cross-validation) set can then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) can begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) can begin. The output generated from the testing set can be compared with the corresponding desired target values to give a final assessment of the trained machine learning model's accuracy. Other segmentations of the larger data set or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training can be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters can then be fixed and the machine learning model can be deployed to generate output in real-world applications (also referred to as "inference").

In some examples, a trained machine learning model can be fine-tuned, meaning that the values of the learned parameters can be adjusted slightly in order for the machine learning model to better model a specific task. Fine-tuning of a machine learning model typically involves further training the machine learning model on a number of data samples (which can be smaller in number/cardinality than those used to train the model initially) that closely target the specific task. For example, a machine learning model for generating natural language, e.g., for alerts to operators, or commands that have been trained generically on publicly available text corpora can be, e.g., fine-tuned by further training using specific training samples. The specific training samples can be used to generate language in a certain style or in a certain format. For example, the machine learning model can be trained to generate a blog post having a particular style and structure with a given topic.

Some concepts in machine learning-based language models are now discussed. It can be noted that, while the term "language model" has been commonly used to refer to a machine learning-based language model, there could exist non-machine learning language models. In the present disclosure, the term "language model" can refer to a machine learning-based language model (e.g., a language model that is implemented using a neural network or other machine learning architecture, unless stated otherwise). For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model can contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any machine learning-based language model, including language models based on other neural network architectures such as RNN-based language models.

Figure 3:
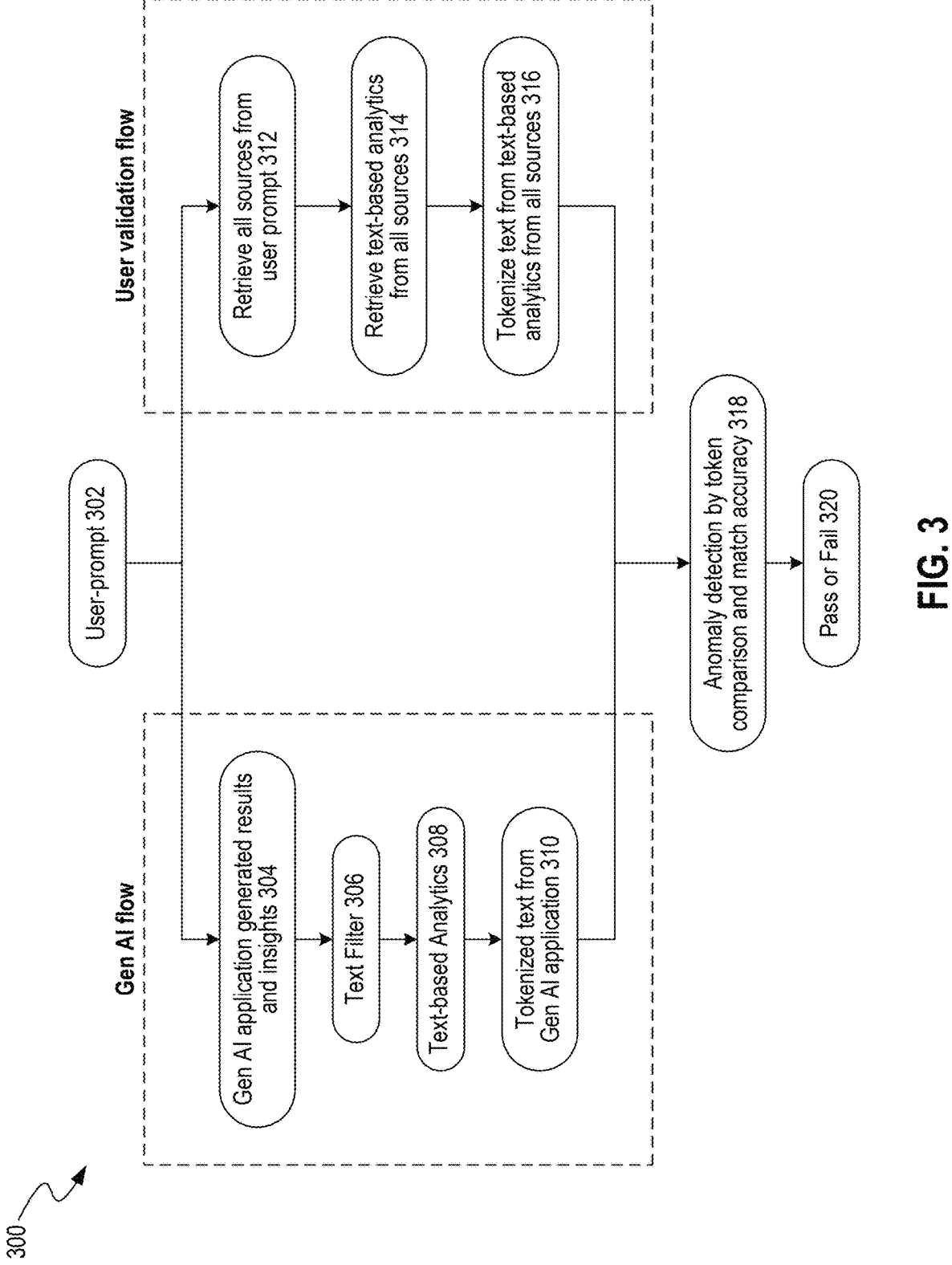
FIG. 3 illustrates a flow for detecting anomalies in model outputs, in accordance with one or more implementations of this disclosure.

FIG. 3 illustrates a flow 300 for detecting anomalies in model outputs, in accordance with one or more implementations of this disclosure. As shown in FIG. 3, the flow 300 can include both a generative AI flow ("Gen AI flow") and a validation flow ("User validation flow"). A user prompt 302 can feed into both of these flows, and the results of both flows can be compared to determine whether to approve or reject the model output (e.g., Pass or Fail 320). For example, in the "Gen AI flow," the user prompt 302 can be processed by an AI model to produce an initial output (e.g., Gen AI application-generated results and insights 304). This output can include various forms of analytics, such as text-based summaries, statistical analyses, and visual representations of data. The AI model leverages its training on extensive datasets to generate a comprehensive response that addresses the specifics of the user prompt. Simultaneously, in the "User validation flow," the same user prompt 302 can be used to retrieve relevant data from trusted sources. This data can be processed and analyzed independently to create a benchmark output. The benchmark output serves as a reference point for validating the AI model's output. Once both the model output and the benchmark output are available and correctly formatted, the anomaly detection system can compare the two (e.g., anomaly detection by token comparison and match accuracy 318). The anomaly detection system can identify any discrepancies, anomalies, or deviations that can indicate potential errors or inaccuracies in the model output. If the comparison reveals that the model output aligns closely with the benchmark output, the system can approve the model output for user consumption. However, if significant discrepancies are detected, the system can reject the model output and flag it for further review. This ensures that only accurate and reliable information is presented to the user.

In particular, the anomaly detection system receives a user prompt (e.g., the user prompt 302) indicating a request for data over a time period. As an illustrative example, the user prompt can include "Show the trend in the number of transactions for Firm-A in New York for 2024." In some implementations, the user prompt requests a report summarizing the data over a time period. For example, the user prompt can request a type of report or summary or can specify certain formats for the outputs. The anomaly detection system can accommodate various user preferences by allowing customization of the report format, such as including specific data visualizations like graphs or charts, or focusing on particular metrics or key performance indicators (KPIs).

Figure 4:
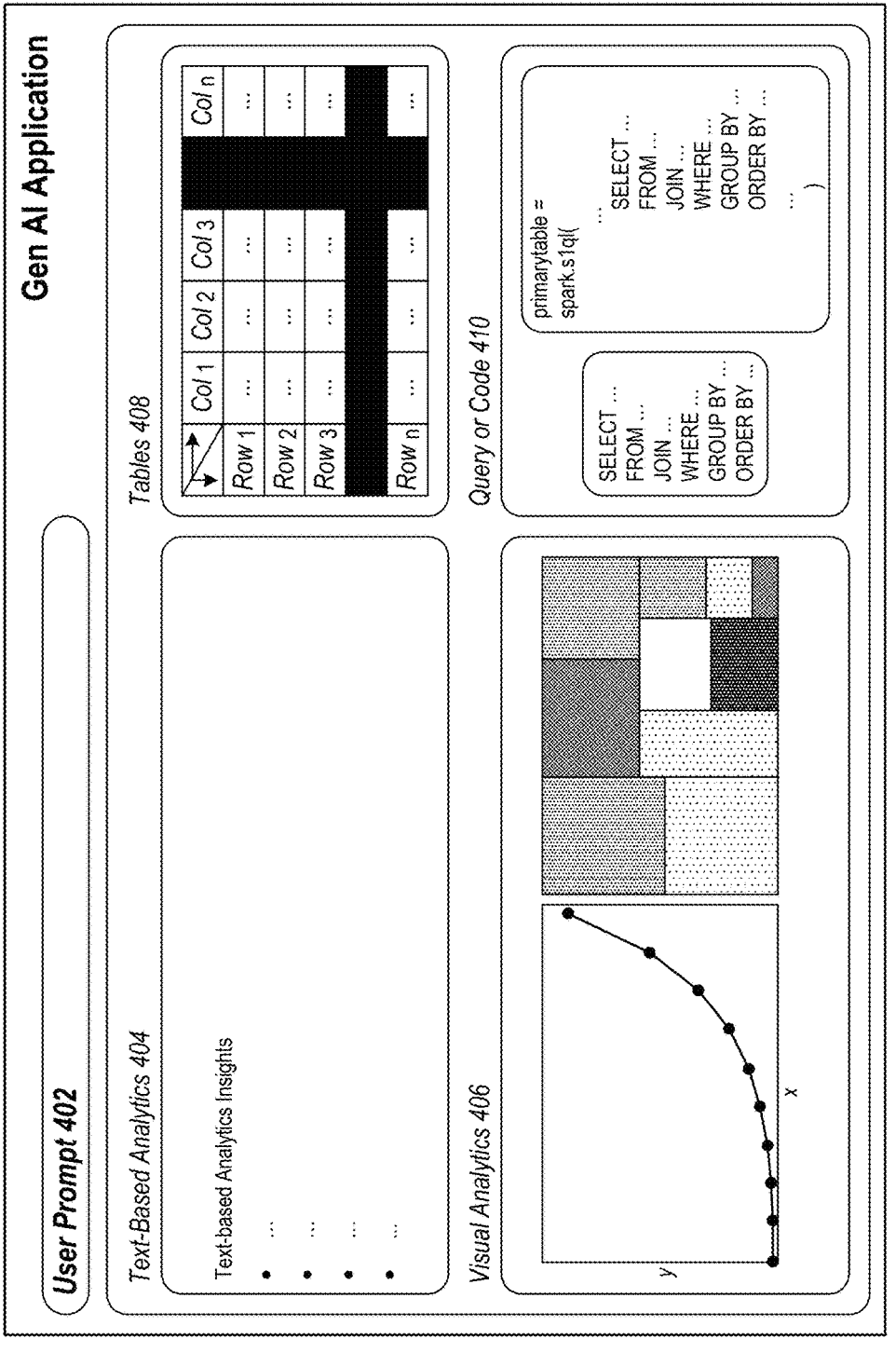
FIG. 4 illustrates a user interface for detecting anomalies in model outputs, in accordance with one or more implementations of this disclosure.

FIG. 4 illustrates a UI 400 for detecting anomalies in model outputs, in accordance with one or more implementations of this disclosure. As shown in FIG. 4, the UI 400 can include a field for a user to input a user prompt 402, a portion of the UI dedicated to displaying text-based analytics 404, portions of the UI dedicated to displaying visual analytics 406 or tables 408, and query or code 410. In some implementations, the text-based analytics 404, the visual analytics 406, and the tables 408 are analyzed for anomalies using the methods discussed herein before being generated for display on the UI 400. In some implementations, the text-based analytics 404 are analyzed for anomalies using the methods discussed herein, and once the anomaly detection system verifies that the text-based analytics 404 do not include any anomalies, the anomaly detection system generates the visual analytics 406 and the tables 408 (e.g., based on the text-based analytics 404) for display. In some implementations, the query or code 410 can include a query or code used by the AI model to retrieve data for generating an output (e.g., discussed in greater detail below). In some implementations, the UI 400 includes other information or other configurations.

When the anomaly detection system receives the user prompt, the anomaly detection system can generate a first plurality of tokens. For example, as shown in FIG. 3, the "Gen AI flow" can be used to generate the first plurality of tokens. These first tokens reflect the model outputs, which must be analyzed for anomalies. In particular, the anomaly detection system can input the user prompt into an AI model (e.g., machine learning model 202, as shown in FIG. 2). This can cause the AI model to generate an output based on the user prompt (e.g., Gen AI application generated results and insights 304, as shown in FIG. 3). The output can include a plurality of text-based analytics and a plurality of visual analytics based on the user prompt. As shown in FIG. 4, the outputs can include the text-based analytics 404, the visual analytics 406, and other information. For example, the AI model can produce a detailed report that includes textual summaries of transaction trends, statistical analyses, and key insights derived from the data. Additionally, the output can feature visual elements such as graphs, charts, and heatmaps that illustrate the trends and patterns in the data over the specified time period.

The anomaly detection system can apply a text filter to the output from the AI model to generate a modified output. The modified output can include the plurality of text-based analytics and excluding the plurality of visual analytics. For example, the text filter can be designed to identify and extract only the textual content from the AI model's output, disregarding any visual elements such as graphs, charts, and images. The text filter can work by parsing the output and recognizing specific tags or markers that differentiate text-based content from visual content. It can then isolate the sections of the output that contain textual information, such as summaries, explanations, and statistical analyses. The filter can also remove any references to visual elements to ensure that the modified output is purely text-based. Additionally, the text filter can be configured to enhance the readability and coherence of the extracted text. This can involve reformatting text, correcting any grammatical errors, and ensuring that the extracted content flows logically. The result can be a clean, text-only version of the AI model's output that retains all the relevant analytical insights while excluding any visual components (e.g., text-based analytics 308, as shown in FIG. 3).

Techniques for applying a text filter are described in U.S. application Ser. No. 18/669,421, titled "Systems and Methods for Modifying Decision Engines During Software Development Using Variable Deployment Criteria" and filed on May 20, 2024, which is hereby incorporated by reference. For example, a filter can employ a variety of techniques and technologies to identify content within outputs. The filter can use keyword filtering, where filters scan text-based content for specific keywords, phrases, or patterns. Additionally or alternatively, the filter can analyze images and videos to identify the content. This can involve image recognition, facial detection, or algorithms that recognize the content of images or videos. Additionally or alternatively, the filter can categorize text into predefined categories. The system can set filtering rules based on these categories. The filter can include models that can be trained to recognize patterns within outputs. They can adapt and improve their filtering capabilities over time.

Once the anomaly detection system has generated a modified output including the text-based analytics generated by the model, the anomaly detection system can generate the first plurality of tokens based on the plurality of text-based analytics (e.g., tokenized text from Gen AI application 310, as shown in FIG. 3). For example, to generate the first plurality of tokens, the anomaly detection system can tokenize the output from the AI model or the plurality of text-based analytics to extract a first plurality of keywords. Tokens can be words, phrases, symbols, or other meaningful elements that are used to break down and analyze text. Tokenizing is the process of converting a sequence of text into these smaller, manageable units called tokens. This process involves segmenting the text into individual components, which can then be used for various analytical purposes. In the context of the anomaly detection system, tokenizing the output means breaking down the text-based analytics into discrete tokens. This can involve identifying and extracting keywords, phrases, or other significant elements from the text. The anomaly detection system can use these tokens to perform further analysis, such as comparing them against tokens derived from reliable data sources to verify the accuracy and consistency of the information.

The anomaly detection system can then generate a second plurality of tokens. For example, as shown in FIG. 3, the "User validation flow" can be used to generate the second plurality of tokens. This flow can involve the anomaly detection system retrieving, based on the user prompt, a plurality of sources relating to the data requested by the user prompt (e.g., retrieve all sources from user prompt 312, as shown in FIG. 3). For example, the anomaly detection system can identify and access various databases, repositories, and information sources pertinent to the user prompt, such as academic journals, industry reports, government databases, and news articles. The anomaly detection system can query external APIs provided by trusted organizations and data providers to ensure real-time access to up-to-date information. For sources not available through APIs or databases, web scraping techniques can be employed to collect data from relevant websites and online publications, adhering to legal guidelines.

In some implementations, the anomaly detection system generates a plurality of queries to request, from the plurality of sources, the data over the time period. For example, the anomaly detection system can begin by analyzing the user prompt to identify key parameters such as the specific data required, the relevant time period, and any pertinent keywords or entities. Based on this analysis, the anomaly detection system can construct a series of structured queries tailored to each source's data retrieval protocols. The anomaly detection system can use predefined templates for different types of sources, such as financial databases, news archives, and social media platforms. These templates can include placeholders for the identified parameters, ensuring that each query is customized to retrieve the most relevant data. For instance, a query template for a financial database might include placeholders for the company's stock ticker symbol, the date range, and the specific financial metrics required (e.g., daily closing prices, trading volumes).

Once the templates are populated with the appropriate parameters, the anomaly detection system can generate the actual queries. This process can involve converting the structured templates into the specific query languages or formats required by each source. For example, a query to a SQL-based financial database might be formatted as an SQL SELECT statement, while a query to a RESTful API might be formatted as an HTTP GET request with query parameters. The anomaly detection system can also incorporate error handling and validation mechanisms into the query generation process. This can include checks to ensure that the generated queries are syntactically correct and that they adhere to any constraints or limitations imposed by the data sources. For example, the anomaly detection system can validate that date ranges are within acceptable limits and that required fields are not left empty. After generating the queries, the anomaly detection system can execute them in parallel to retrieve the data over the time period from the various sources (e.g., retrieve text-based analytics from all sources 314, as shown in FIG. 3). The retrieved data can then be aggregated and processed to create a comprehensive dataset that covers the specified time period.

Figure 5:
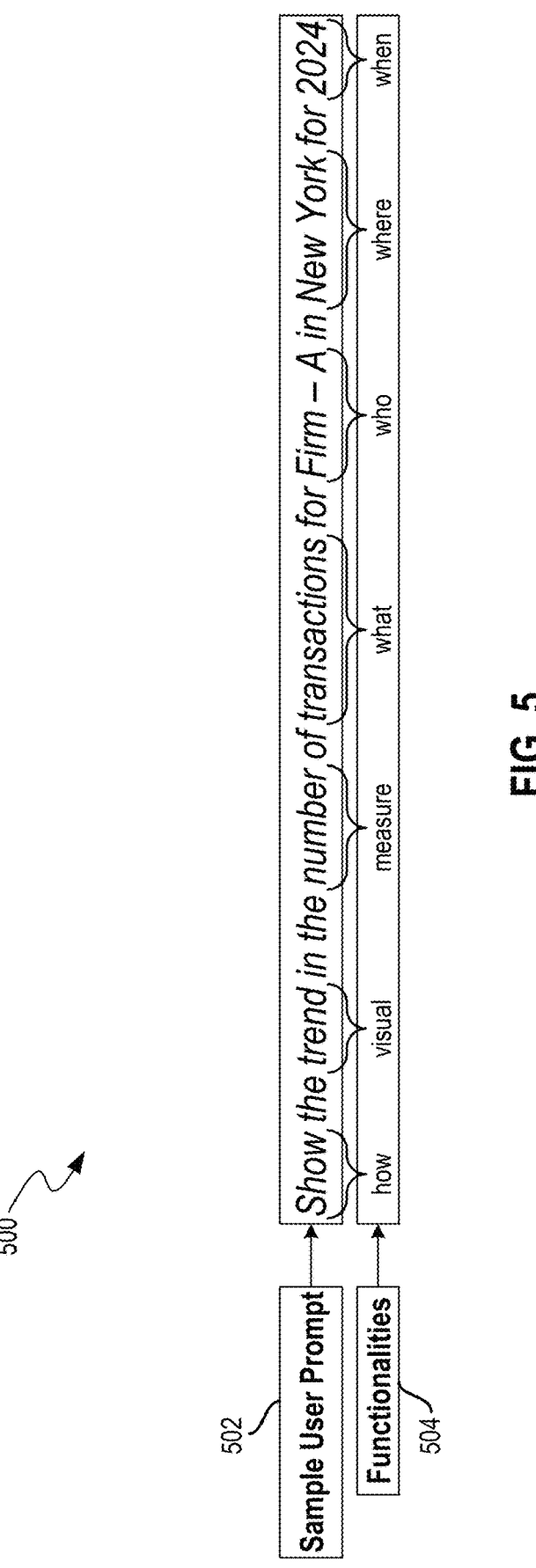
FIG. 5 is an example of a user prompt, in accordance with one or more implementations of this disclosure.

FIG. 5 is an example of a user prompt 500, in accordance with one or more implementations of this disclosure. As shown in FIG. 5, a sample user prompt 502 is "Show the trend in the number of transactions for Firm-A in New York for 2024." The anomaly detection system can break down this prompt by functionalities 504 into key parameters. For example, "Show" is a parameter indicating "how" to generate the prompt, "trend" is indicative of a visual output, "number" indicates a request for a measure, "transactions" is the parameter for which the user is requesting the measure, "Firm-A" is the "who," "New York" indicates "where," and "2024" indicates "when," or the time period. As discussed above, the anomaly detection system can use these key parameters and their functionalities 504 to populate queries for the sources. As an example, query or code 410, as shown in FIG. 4, can include templates or sample code for querying the sources, and the anomaly detection system can utilize the query or code 410 in conjunction with the key parameters and functionalities, as shown in FIG. 3, to generate the queries.

Once the anomaly detection system has executed the queries to the sources and received the data, the anomaly detection system can generate the second plurality of tokens based on the data over the time period (e.g., tokenize text from text-based analytics from all sources 316, as shown in FIG. 3). For example, the anomaly detection system can tokenize the data over the time period to extract a second plurality of keywords within the data over the time period. As previously discussed, the tokens can be words, phrases, symbols, or other meaningful elements that are used to break down and analyze text. Tokenizing the retrieved data can involve breaking down the data over the time period into discrete tokens. This can involve identifying and extracting keywords, phrases, or other significant elements from the text. The anomaly detection system can use these tokens to perform a comparison of the first plurality of tokens and the second plurality of tokens. Based on the comparison, the anomaly detection system can accept or reject the output of the AI model.

Validation techniques relating to LLMs are described in U.S. patent application Ser. No. 18/907,414, filed Oct. 4, 2024, entitled "DYNAMIC INPUT-SENSITIVE VALIDATION OF MACHINE LEARNING MODEL OUTPUTS AND METHODS AND SYSTEMS OF THE SAME," and U.S. patent application Ser. No. 18/951,120, filed Nov. 18, 2024, entitled "DYNAMIC EVALUATION OF LANGUAGE MODEL PROMPTS FOR MODEL SELECTION AND OUTPUT VALIDATION AND METHODS AND SYSTEMS OF THE SAME," which are hereby incorporated by reference. For example, the system can evaluate an LLM output for accuracy, security, safety (e.g., with respect to associated policies, requirements, or criteria), compliance (e.g., compliance with regulations, rules, guidelines, etc.), and/or other requirements/recommendations. In response to validating the generated output, the data generation platform can transmit this information to an associated data store or deployment system (e.g., any relevant consumer of the generated data, such as a server that is accessible to the user). The anomaly detection system can use any of these techniques to validate or assess outputs from the AI model.

In some implementations, the anomaly detection system can perform a comparison of the first plurality of tokens and the second plurality of tokens to determine a match accuracy. In some implementations, the anomaly detection system uses one-to-one matching of tokens. One-to-one matching between tokens involves directly comparing each token from the first set of tokens to a corresponding token in the second set to determine if they are identical or sufficiently similar. This method ensures that each token in one set has a unique counterpart in the other set. The process begins by aligning the tokens based on their positions or predefined criteria, ensuring that the first token in the first set is compared to the first token in the second set, the second token to the second token, and so on. This alignment can be particularly useful in structured data where the order of tokens is significant, such as in time-series data or sequences of events. Once aligned, each pair of tokens is compared using exact matching or similarity metrics like cosine similarity, Jaccard similarity, or Levenshtein distance. Exact matching checks if the tokens are identical, while similarity metrics allow for a degree of variation, accounting for minor differences in spelling or phrasing. One-to-one matching is highly effective in scenarios where the sequence and position of tokens are crucial, as it preserves the structural integrity of the data. However, it can be less flexible in handling cases where tokens can be reordered or where there are insertions or deletions.

In some implementations, to perform the comparison, the anomaly detection system can compare a first plurality of keywords extracted from the output or the plurality of text-based analytics and a second plurality of keywords extracted from the data over the time period. These keywords represent the most significant terms and concepts within the text, providing a basis for comparison. Next, the anomaly detection system can apply various text analysis techniques to refine the keyword extraction process. This can include removing stop words (common words that do not carry significant meaning, such as "and," "the," "is"), stemming or lemmatizing words to their root forms (e.g., "running" to "run"), and identifying named entities (e.g., company names, locations, dates). By refining the keywords in this manner, the anomaly detection system ensures that the comparison focuses on the most relevant and meaningful terms.

Once the keywords are extracted and refined, the anomaly detection system can perform a similarity analysis to compare the first plurality of keywords (e.g., from the output) with the second plurality of keywords (e.g., from the sources). This can involve calculating various similarity metrics, such as cosine similarity, Jaccard similarity, or Levenshtein distance. These metrics quantify the degree of overlap or similarity between the two sets of keywords, providing a measure of match accuracy. For example, cosine similarity measures the cosine of the angle between two non-zero vectors of an inner product space, which in this case are the keyword vectors. A cosine similarity score close to 1 indicates a high degree of similarity, while a score close to 0 indicates low similarity. Jaccard similarity measures the size of the intersection divided by the size of the union of the two sets of keywords, providing a ratio that reflects the overlap between the sets. Levenshtein distance calculates the minimum number of single-character edits (insertions, deletions, or substitutions) required to change one word into the other, providing a measure of the difference between the keywords. By applying these similarity metrics, the anomaly detection system can determine the match accuracy between the first and second pluralities of keywords. A high match accuracy indicates that the output closely aligns with the data retrieved over the time period, suggesting that the information is consistent and reliable. Conversely, a low match accuracy can indicate discrepancies or anomalies, prompting further investigation or validation.

In some implementations, the anomaly detection system can categorize the keywords according to importance or other criteria. The anomaly detection system can begin by categorizing the extracted keywords based on their contextual relevance and importance. For example, the first category of keywords might include critical terms such as company names, product names, or specific financial metrics that are directly related to the user prompt. The anomaly detection system can then identify the first subset of keywords from the output and the second subset of keywords from the data that belong to this first category. Using similarity metrics such as cosine similarity or Jaccard similarity, the anomaly detection system can calculate the first similarity score between these two subsets. This score is then compared against a predefined first similarity threshold, which represents the minimum acceptable level of similarity for the keywords in this category. If the first similarity score meets or exceeds the threshold, it indicates that the keywords in the first category are sufficiently aligned between the output and the data.

Similarly, to determine a second category of keywords for which a second similarity between a third subset of keywords of the first plurality of keywords and a fourth subset of keywords of the second plurality of keywords must satisfy a second similarity threshold, the third subset of keywords and the fourth subset of keywords belonging to the second category, the anomaly detection system can categorize another set of keywords based on different contextual criteria. The second category might include supporting terms such as dates, locations, or general descriptors that provide additional context but are not as critical as the first category. The anomaly detection system can then identify the third subset of keywords from the output and the fourth subset of keywords from the data that belong to this second category. The second similarity score is calculated between these two subsets using the same or different similarity metrics. This score is compared against a predefined second similarity threshold, which can be set at a different level (e.g., a lower level) than the first threshold to reflect the varying importance of the categories. Meeting or exceeding this threshold indicates that the keywords in the second category are adequately aligned.

To perform the comparison, the anomaly detection system can perform a first comparison between the first similarity of keywords in the first category with the first similarity threshold. This involves evaluating whether the calculated first similarity score for the first category of keywords meets or exceeds the predefined first similarity threshold. If the score meets the threshold, it suggests that the critical keywords are consistent between the output and the data. Next, the anomaly detection system can perform a second comparison between the second similarity and the second similarity threshold. This involves evaluating whether the calculated second similarity score for the second category of keywords meets or exceeds the predefined second similarity threshold. If this score meets the threshold, it indicates that the supporting keywords are also consistent. Finally, the anomaly detection system can determine the match accuracy based on the results of the first comparison and the second comparison. If both comparisons indicate that the similarity scores meet or exceed their respective thresholds, the overall match accuracy is considered high, suggesting that the output is reliable and consistent with the data. If either comparison fails to meet the threshold, the match accuracy is considered lower, indicating potential discrepancies or anomalies that can require further investigation. This multi-tiered comparison approach ensures a comprehensive evaluation of the output's alignment with the data, enhancing the reliability and accuracy of the anomaly detection process.

In addition to similarity metrics like cosine similarity, Jaccard similarity, and Levenshtein distance, there are several other methods to determine whether the first and second pluralities of tokens match. One approach is to use semantic similarity techniques, which involve understanding the meaning of the words rather than just their syntactic similarity. Techniques such as Word2Vec, GloVe, or BERT embeddings can be employed to convert words into high-dimensional vectors that capture their semantic context. By calculating the cosine similarity between these vectors, the system can determine how closely related the meanings of the tokens are. Another method is to use fuzzy matching algorithms, which can handle minor typographical errors and variations in spelling. Additionally, the use of ontology-based matching can be beneficial, where tokens are mapped to concepts in a predefined ontology or knowledge graph. This allows the system to recognize that different terms can refer to the same underlying concept (e.g., "car" and "automobile"). Contextual analysis can also be applied, where the surrounding words and phrases are analyzed to determine if the tokens are used in a similar context. This can be achieved through techniques like n-gram analysis or using advanced language models that consider the entire sentence or paragraph.

In some implementations, once the anomaly detection system performs the comparison, the anomaly detection system determines whether the match accuracy satisfies an anomaly detection threshold. This threshold represents the minimum level of similarity required for the data to be considered consistent and free of anomalies. The anomaly detection system can use various comparison techniques to calculate the match accuracy, such as those discussed above or a combination of techniques. In some implementations, the anomaly detection threshold is specific to the method or analysis used to assess the match accuracy. For example, if the anomaly detection system uses cosine similarity, it calculates the cosine of the angle between the vectors representing the first and second pluralities of tokens. A cosine similarity score close to 1 indicates a high degree of similarity, suggesting that the tokens are closely aligned. If this score meets or exceeds the predefined anomaly detection threshold, the data is considered consistent. Conversely, a score lower than the threshold indicates potential anomalies, prompting further investigation. Similarly, if the anomaly detection system employs Jaccard similarity, it measures the size of the intersection divided by the size of the union of the two sets of tokens. A high Jaccard similarity score indicates substantial overlap between the sets, while a low score suggests discrepancies. The anomaly detection system compares this score against the anomaly detection threshold to determine if the data is reliable. Using Levenshtein distance, the anomaly detection system calculates the minimum number of single-character edits required to transform one token set into the other. A low Levenshtein distance indicates high similarity, while a high distance points to significant differences. The anomaly detection system assesses whether the calculated distance falls within the acceptable range defined by the anomaly detection threshold.

Based on the match accuracy failing to satisfy the anomaly detection threshold, the anomaly detection system can reject the output of the AI model. This rejection process involves several steps to ensure that the output is thoroughly evaluated and the reasons for rejection are clearly documented. First, the anomaly detection system can log the specific areas where the output failed to meet a threshold, such as discrepancies in key data points, inconsistencies in the information, or significant deviations from the validated sources. For example, if the AI model's output includes financial metrics that do not align with the data retrieved from trusted financial databases, the anomaly detection system can highlight these discrepancies. The subsystem can then generate a detailed report outlining the reasons for rejection, including the specific tokens or data points that contributed to the low match accuracy. This report can be used for further analysis and review by human experts, who can investigate the anomalies and determine the appropriate corrective actions. Additionally, the anomaly detection system can provide feedback to the AI model, indicating the areas that need improvement. This feedback loop can help refine the model's training and improve its future outputs. By rejecting outputs that fail to meet the anomaly detection threshold, the anomaly detection system ensures that only accurate and reliable information is included in the final report, maintaining the integrity and trustworthiness of the data.

Based on the match accuracy satisfying the anomaly detection threshold, the anomaly detection system can approve the output of the AI model for inclusion in the report requested by the user prompt. This approval process involves validating that the output meets the required standards of accuracy and consistency. Once the match accuracy is confirmed to be above the threshold, the subsystem can generate a summary of the validation process, including the similarity scores and the comparison techniques used. For example, if the output includes a trend analysis of stock prices, the anomaly detection system can document the cosine similarity scores between the generated output and the validated financial data. The approved output can then be formatted and integrated into the final report, ensuring that it aligns with the user's requirements and the overall structure of the report. The anomaly detection system can also store the approved output and the validation summary in a structured repository, making it available for future reference and audits. This repository can include metadata such as the date of approval, the user prompt, and the sources used for validation. By approving outputs that meet the anomaly detection threshold, the anomaly detection system ensures that the final report is comprehensive, accurate, and reliable.

Figure 8:
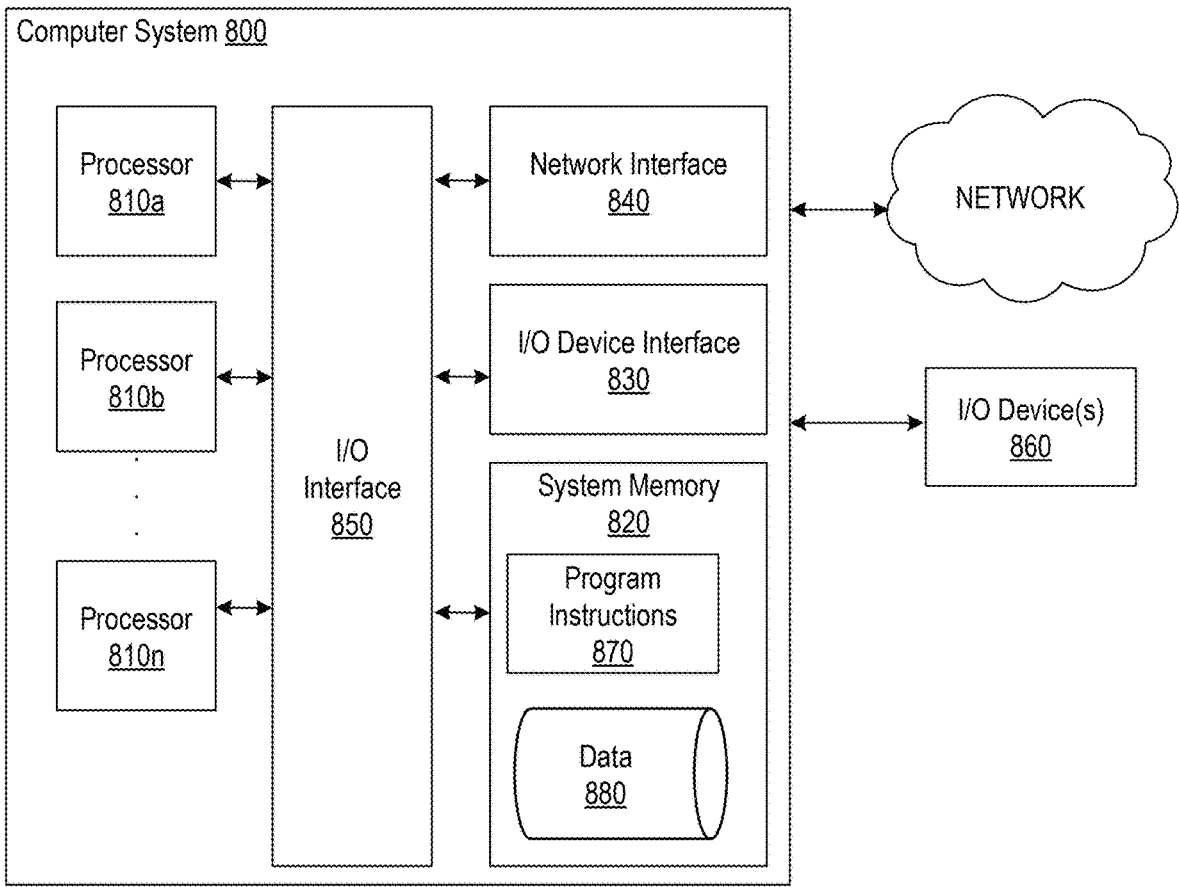
FIG. 8 illustrates an example computing system that can be used in accordance with some implementations of this disclosure.

FIG. 6 is a flowchart 600 of operations for detecting anomalies in model outputs, in accordance with one or more implementations of this disclosure. The operations of FIG. 6 can use components described in relation to FIG. 6. In some implementations, the anomaly detection system 160 can include one or more components of computer system 800, as shown in FIG. 8.

At operation 602, the anomaly detection system 160 (e.g., using one or more of processors 810a-810n) can receive a user prompt indicating a request for data over a time period. For example, a user can input a prompt such as "Show the trend in the number of transactions for Firm-A in New York for 2024." This prompt specifies the type of data requested (number of transactions), the entity of interest (Firm-A), the location (New York), and the time period (2024). One or more of processors 810a-810n can receive the user prompt over the communication network 140 using network interface 640.

At operation 604, the anomaly detection system 160 (e.g., using one or more of processors 810a-810n) can input, into an AI model, the user prompt to cause the AI model to generate an output based on the user prompt. For example, if the user prompt is "Show the trend in the number of transactions for Firm-A in New York for 2024," the system can feed this prompt into the AI model. The output can include a narrative description of the transaction trends, statistical summaries, and visualizations such as graphs or charts. For instance, the model can produce a line graph showing the monthly transaction volumes for Firm-A in New York throughout 2024, accompanied by a textual analysis highlighting any significant trends or anomalies observed in the data. The AI model can also incorporate relevant contextual information to enhance the output. For example, it can include insights on external factors that could have influenced the transaction trends, such as economic conditions, regulatory changes, or significant events related to Firm-A.

At operation 606, the anomaly detection system 160 (e.g., using one or more of processors 810a-810n) can generate a first plurality of tokens based on the output. This process involves breaking down the generated output into smaller, manageable units of information, known as tokens. These tokens can represent individual words, phrases, or key data points that capture the essential elements of the output. For example, if the output is a detailed report on the trend in the number of transactions for Firm-A in New York for 2024, the tokens can include terms like "Firm-A," "New York," "2024," "transactions," "trend," and specific numerical values or dates mentioned in the report.

At operation 608, the anomaly detection system 160 (e.g., using one or more of processors 810a-810n) can retrieve, based on the user prompt, a plurality of sources relating to the data requested by the user prompt. This retrieval process involves accessing various databases, repositories, and information sources that are relevant to the parameters specified in the user prompt. For example, if the user prompt requests data on the trend in the number of transactions for Firm-A in New York for 2024, the system can query financial databases, transaction logs, and business intelligence platforms to gather the necessary data.

At operation 610, the anomaly detection system 160 (e.g., using one or more of processors 810a-810n) can generate a plurality of queries to request, from the plurality of sources, the data over the time period. This can involve creating specific and structured queries tailored to each data source's format and retrieval protocols. For example, if the user prompt is to analyze the trend in the number of transactions for Firm-A in New York for 2024, the system can generate SQL queries for relational databases, API requests for web services, and web scraping scripts for online articles and reports.

At operation 612, the anomaly detection system 160 (e.g., using one or more of processors 810a-810n) can generate a second plurality of tokens based on the data over the time period. This can involve breaking down the retrieved data into smaller, manageable units of information, known as tokens. These tokens can represent individual words, phrases, or key data points that capture the essential elements of the data. For example, if the retrieved data includes transaction records for Firm-A in New York for 2024, the tokens can include terms like "Firm-A," "New York," "2024," "transactions," specific transaction counts, and dates.

At operation 614, the anomaly detection system 160 (e.g., using one or more of processors 810a-810n) can perform a comparison of the first plurality of tokens and the second plurality of tokens. This comparison process involves evaluating the similarity and alignment between the tokens generated from the AI model's output and the tokens generated from the retrieved data. The system can use various similarity metrics and algorithms to perform this comparison, such as cosine similarity, Jaccard similarity, and Levenshtein distance.

At operation 616, the anomaly detection system 160 (e.g., using one or more of processors 810a-810n) can, based on the comparison, accept or reject the output of the AI model. This decision is made by evaluating whether the match accuracy between the first plurality of tokens (from the AI model's output) and the second plurality of tokens (from the retrieved data) meets the predefined anomaly detection threshold. If the match accuracy satisfies the threshold, indicating that the output is consistent and reliable, the system can accept the output. This accepted output can then be included in the final report or used for further analysis as requested by the user prompt.

Figure 7:
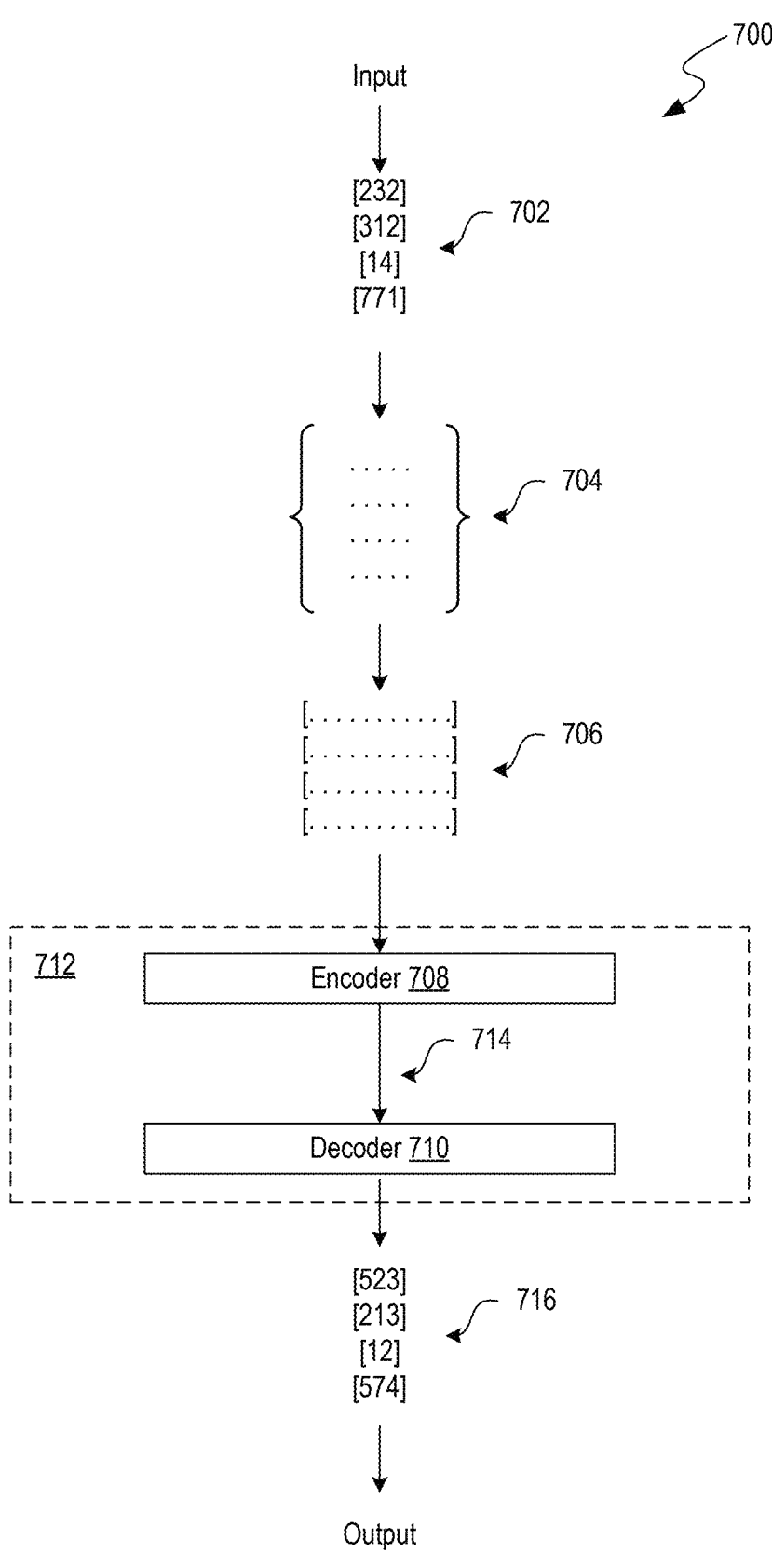
FIG. 7 is a block diagram of an example transformer used to detect anomalies in model outputs, in accordance with one or more implementations of this disclosure.

FIG. 7 is a block diagram 700 of an example transformer 712 used to detect anomalies in generative outputs, in accordance with one or more implementations of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure can be applicable to any machine learning-based language model, including language models based on other neural network architectures, such as RNN-based language models.

The transformer 712 includes an encoder 708 (which can include one or more encoder layers/blocks connected in series) and a decoder 710 (which can include one or more decoder layers/blocks connected in series). Generally, the encoder 708 and the decoder 710 each include multiple neural network layers, at least one of which can be a self-attention layer. The parameters of the neural network layers can be referred to as the parameters of the language model.

The transformer 712 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 712 is trained to perform certain functions on input formats other than natural language input. For example, the input can include objects, images, audio content, or video content, or a combination thereof.

The transformer 712 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 7 illustrates an example block diagram 700 of how the transformer 712 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

As shown in the example 700, a short sequence of tokens 702 corresponding to the input text is illustrated as input to the transformer 712. Tokenization of the text sequence into the tokens 702 can be performed by some pre-processing tokenization module such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 712 can be of any length up to a maximum length defined based on the dimensions of the transformer 712. Each token 702 in the token sequence is converted into an embedding 706 (also referred to as "embedding vector").

An embedding 706 is a learned numerical representation (such as, for example, a vector) of a token that captures some semantic meaning of the text segment represented by the token 702. The embedding 706 represents the text segment corresponding to the token 702 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 706 corresponding to the "write" token will be closer to another embedding corresponding to the "jot down" token in the vector space as compared to the distance between the embedding 706 corresponding to the "write" token and another embedding corresponding to the "summary" token.

The vector space can be defined by the dimensions and values of the embedding vectors. Various techniques can be used to convert a token 702 to an embedding 706. For example, another trained machine learning model can be used to convert the token 702 into an embedding 706. In particular, another trained machine learning model can be used to convert the token 702 into an embedding 706 in a way that encodes additional information into the embedding 706 (e.g., a trained machine learning model can encode positional information about the position of the token 702 in the text sequence into the embedding 706). In some implementations, the numerical value of the token 702 can be used to look up the corresponding embedding in an embedding matrix 704, which can be learned during training of the transformer 712.

The generated embeddings, e.g., such as the embedding 706, are input into the encoder 708. The encoder 708 serves to encode the embedding 706 into feature vectors 714 that represent the latent features of the embedding 706. The encoder 708 can encode positional information (i.e., information about the sequence of the input) in the feature vectors 714. The feature vectors 714 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 714, that can be generated by the encoder 708 can be referred to as a latent space or feature space.

Conceptually, the decoder 710 is designed to map the features represented by the feature vectors 714 into meaningful output, which can depend on the task that was assigned to the transformer 712. For example, if the transformer 712 is used for a translation task, the decoder 710 can map the feature vectors 714 into text output in a target language different from the language of the original tokens 702. Generally, in a generative language model, the decoder 710 serves to decode the feature vectors 714 into a sequence of tokens. The decoder 710 can generate output tokens 716 one by one. Each output token 716 can be fed back as input to the decoder 710 in order to generate the next output token

716. By feeding back the generated output and applying self-attention, the decoder 710 can generate a sequence of output tokens 716 that has sequential meaning (e.g., the resulting output text sequence is understandable as a sentence and obeys grammatical rules). The decoder 710 can generate output tokens 716 until a special [EOT] token (indicating the end of the text) is generated. The resulting sequence of output tokens 716 can then be converted to a text sequence in post-processing. For example, each output token 716 can be an integer number that corresponds to a vocabulary index. By looking up the text segment using the vocabulary index, the text segment corresponding to each output token 716 can be retrieved, the text segments can be concatenated together, and the final output text sequence can be obtained.

In some implementations, the input provided to the transformer 712 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,047 input tokens), and is able to generate a large number of tokens as output (e.g., up to 2,047 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

The above-described implementations of the present disclosure are presented for purposes of illustration, not of limitation, and the present disclosure is limited only by the claims which follow. Furthermore, it should be noted that the features and limitations described in any one implementation can be applied to any other implementation herein, and flowcharts or examples relating to one implementation can be combined with any other implementation in a suitable manner, done in different orders, or done in parallel. In addition, the systems and methods described herein can be performed in real time. It should also be noted that the systems or methods described above can be applied to, or used in accordance with, other systems or methods.

FIG. 8 shows an example computing system that can be used in accordance with some implementations of this disclosure. In some instances, computing system 800 is referred to as a computer system 800. A person skilled in the art would understand that those terms can be used interchangeably. The components of FIG. 8 can be used to perform some or all operations discussed in relation to FIGS. 1-7. Furthermore, various portions of the systems and methods described herein can include or be executed on one or more computer systems similar to computing system 800. Further, processes and modules described herein can be executed by one or more processing systems similar to that of computing system 800.

Computing system 800 can include one or more processors (e.g., processors 810a-810n) coupled to system memory 820, an input/output (I/O) device interface 830, and a network interface 840 via an I/O interface 850. A processor can include a single processor or a plurality of processors (e.g., distributed processors). A processor can be any suitable processor capable of executing or otherwise performing instructions. A processor can include a central processing unit (CPU) that carries out program instructions to perform the arithmetical, logical, and I/O operations of computing system 800. A processor can execute code (e.g., processor firmware, a protocol stack, a database management system, an operating system, or a combination thereof) that creates an execution environment for program instructions.

A processor can include a programmable processor. A processor can include general or special purpose microprocessors. A processor can receive instructions and data from a memory (e.g., system memory 820). Computing system 800 can be a uni-processor system including one processor (e.g., processor 810a), or a multiprocessor system including any number of suitable processors (e.g., 810a-810n). Multiple processors can be employed to provide for parallel or sequential execution of one or more portions of the techniques described herein. Processes, such as logic flows, described herein can be performed by one or more programmable processors executing one or more computer programs to perform functions by operating on input data and generating corresponding output. Processes described herein can be performed by, and apparatus can also be implemented as, special purpose logic circuitry, e.g., an FPGA (field-programmable gate array) or an ASIC (application-specific integrated circuit). Computing system 800 can include a plurality of computing devices (e.g., distributed computer systems) to implement various processing functions.

V/O device interface 830 can provide an interface for connection of one or more I/O devices 860 to computer system 800. I/O devices can include devices that receive input (e.g., from a user) or output information (e.g., to a user). I/O devices 860 can include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 can be connected to computer system 800 through a wired or wireless connection. I/O devices 860 can be connected to computer system 800 from a remote location. I/O devices 860 located on remote computer systems, for example, can be connected to computer system 800 via a network and network interface 840.

The I/O device interface 830 and I/O devices 860 can be used to enable manipulation of the three-dimensional model as well. For example, the user can be able to use I/O devices such as a keyboard and touchpad to indicate specific selections for nodes, adjust values for nodes, select from the history of machine learning models, select specific inputs or outputs, or the like. Alternatively or additionally, the user can use their voice to indicate specific nodes, specific models, or the like via the voice recognition device or microphones.

Network interface 840 can include a network adapter that provides for connection of computer system 800 to a network. Network interface 840 can facilitate data exchange between computer system 800 and other devices connected to the network. Network interface 840 can support wired or wireless communication. The network can include an electronic communication network, such as the internet, a LAN, a WAN, a cellular communications network, or the like.

System memory 820 can be configured to store program instructions 870 or data 880. Program instructions 870 can be executable by a processor (e.g., one or more of processors 810a-810n) to implement one or more implementations of the present techniques. Program instructions 870 can include modules of computer program instructions for implementing one or more techniques described herein with regard to various processing modules. Program instructions can include a computer program (which in certain forms is known as a program, software, software application, script, or code). A computer program can be written in a programming language, including compiled or interpreted languages, or declarative or procedural languages. A computer program can include a unit suitable for use in a computing environment, including as a stand-alone program, a module, a component, or a subroutine. A computer program can correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one or more computer processors located locally at one site or distributed across multiple remote sites and interconnected by a communication network.

System memory 820 can include a tangible program carrier having program instructions stored thereon. A tangible program carrier can include a non-transitory, computer-readable storage medium. A non-transitory, computer-readable storage medium can include a machine-readable storage device, a machine-readable storage substrate, a memory device, or any combination thereof. A non-transitory, computer-readable storage medium can include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 820 can include a non-transitory, computer-readable storage medium that can have program instructions stored thereon that are executable by a computer processor (e.g., one or more of processors 810a-810n) to cause the subject matter and the functional operations described herein. A memory (e.g., system memory 820) can include a single memory device or a plurality of memory devices (e.g., distributed memory devices).

I/O interface 850 can be configured to coordinate I/O traffic between processors 810a-810n, system memory 820, network interface 840, I/O devices 860, or other peripheral devices. I/O interface 850 can perform protocol, timing, or other data transformations to convert data signals from one component (e.g., system memory 820) into a format suitable for use by another component (e.g., processors 810a-810n). I/O interface 850 can include support for devices attached through various types of peripheral buses, such as a variant of the Peripheral Component Interconnect (PCI) bus standard or the Universal Serial Bus (USB) standard.

Implementations of the techniques described herein can be implemented using a single instance of computer system 800 or multiple computer systems 800 configured to host different portions or instances of implementations. Multiple computer systems 800 can provide for parallel or sequential processing/execution of one or more portions of the techniques described herein.

Those skilled in the art will appreciate that computer system 800 is merely illustrative and is not intended to limit the scope of the techniques described herein. Computer system 800 can include any combination of devices or software that can perform or otherwise provide for the performance of the techniques described herein. For example, computer system 800 can include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 800 can also be connected to other devices that are not illustrated or can operate as a stand-alone system. In addition, the functionality provided by the illustrated components may, in some implementations, be combined in fewer components, or be distributed in additional components. Similarly, in some implementations, the functionality of some of the illustrated components may not be provided, or other additional functionality can be available.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology not only can include additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, either in this application or in a continuing application.

We claim:

1. One or more non-transitory, computer-readable storage medium comprising instructions recorded thereon, wherein the instructions, when executed by at least one data processor of a system, cause the system to:

receive, from a user device, a user prompt indicating a request for a report summarizing data over a time period;

generate a first plurality of tokens by causing the system to:

input, into a generative model, the user prompt to cause the generative model to generate an output based on the user prompt, the output comprising a plurality of text-based analytics and a plurality of visual analytics based on the user prompt;

apply a text filter to the output to generate a modified output comprising the plurality of text-based analytics and excluding the plurality of visual analytics; and generate the first plurality of tokens based on the plurality of text-based analytics;

generate a second plurality of tokens by causing the system to:

retrieve, based on the user prompt, a plurality of sources relating to the data requested by the user prompt;

generate a plurality of queries to request, from the plurality of sources, the data over the time period; and generate the second plurality of tokens based on the data over the time period;

perform a comparison of the first plurality of tokens and the second plurality of tokens to determine a match accuracy;

determine whether the match accuracy satisfies an anomaly detection threshold;

based on the match accuracy failing to satisfy the anomaly detection threshold, determine that the output of the generative model comprises an anomaly;

based on determining that the output of the generative model comprises the anomaly, block transmission of the report to the user device;

generate a detailed report outlining one or more reasons for blocking the transmission, the one or more reasons indicating specific tokens of the first plurality of tokens that contributed to the match accuracy failing to satisfy the anomaly detection threshold; and provide feedback to the generative model indicating the specific tokens to fine-tune the generative model.

2. The one or more non-transitory, computer-readable storage medium of claim 1, wherein the system is further caused to, based on the match accuracy satisfying the anomaly detection threshold, approve the output of the generative model for inclusion in the report requested by the user prompt.

3. The one or more non-transitory, computer-readable storage medium of claim 1, wherein, to generate the first plurality of tokens, the instructions further cause the system to tokenize the plurality of text-based analytics to extract a first plurality of keywords within the plurality of text-based analytics.

4. The one or more non-transitory, computer-readable storage medium of claim 1, wherein, to generate the second plurality of tokens, the instructions further cause the system to tokenize the data over the time period to extract a second plurality of keywords within the data over the time period.

5. The one or more non-transitory, computer-readable storage medium of claim 1, wherein, to perform the comparison, the instructions further cause the system to compare a first plurality of keywords extracted from the plurality of text-based analytics and a second plurality of keywords extracted from the data over the time period.

6. The one or more non-transitory, computer-readable storage medium of claim 5, wherein the instructions further cause the system to:

determine a first category of keywords for which a first similarity between a first subset of keywords of the first plurality of keywords and a second subset of keywords of the second plurality of keywords must satisfy a first similarity threshold, the first subset of keywords and the second subset of keywords belonging to the first category;

determine a second category of keywords for which a second similarity between a third subset of keywords of the first plurality of keywords and a fourth subset of keywords of the second plurality of keywords must satisfy a second similarity threshold, the third subset of keywords and the fourth subset of keywords belonging to the second category; and wherein, to perform the comparison, the instructions further cause the system to:

perform a first comparison between the first similarity and the first similarity threshold;

perform a second comparison between the second similarity and the second similarity threshold; and determine the match accuracy based on the first comparison and the second comparison.

7. A method comprising:

receiving a user prompt indicating a request for data over a time period;

generating a first plurality of tokens by:

inputting, into a generative model, the user prompt to cause the generative model to generate an output based on the user prompt, the output comprising a plurality of text-based analytics and a plurality of visual analytics based on the user prompt;

applying a text filter to the output to generate a modified output comprising the plurality of text-based analytics and excluding the plurality of visual analytics; and generating the first plurality of tokens based on the plurality of text-based analytics;

generating a second plurality of tokens by:

retrieving, based on the user prompt, a plurality of sources relating to the data requested by the user prompt;

generating a plurality of queries to request, from the plurality of sources, the data over the time period; and generating the second plurality of tokens based on the data over the time period;

performing a comparison of the first plurality of tokens and the second plurality of tokens;

based on the comparison, detecting an anomaly in the output of the generative model;

based on the detected anomaly, rejecting the output of the generative model; and automatically providing feedback to the generative model indicating one or more specific tokens of the first plurality of tokens that contributed to a match accuracy failing to satisfy an anomaly detection threshold.

8. The method of claim 7, wherein performing the comparison further comprises:

determining, based on the comparison, a match accuracy between the first plurality of tokens and the second plurality of tokens; and determining whether the match accuracy satisfies an anomaly detection threshold, wherein accepting or rejecting the output of the generative model based on the comparison comprises accepting or rejecting the output based on whether the match accuracy satisfies the anomaly detection threshold.

9. The method of claim 7, wherein generating the first plurality of tokens comprises tokenizing the plurality of text-based analytics to extract a first plurality of keywords within the plurality of text-based analytics.

10. The method of claim 7, wherein generating the second plurality of tokens comprises tokenizing the data over the time period to extract a second plurality of keywords within the data over the time period.

11. The method of claim 7, wherein performing the comparison comprises comparing a first plurality of keywords extracted from the plurality of text-based analytics and a second plurality of keywords extracted from the data over the time period.

12. The method of claim 11, further comprising:

determine a first category of keywords for which a first similarity between a first subset of keywords of the first plurality of keywords and a second subset of keywords of the second plurality of keywords must satisfy a first similarity threshold, the first subset of keywords and the second subset of keywords belonging to the first category; and determine a second category of keywords for which a second similarity between a third subset of keywords of the first plurality of keywords and a fourth subset of keywords of the second plurality of keywords must satisfy a second similarity threshold, the third subset of keywords and the fourth subset of keywords belonging to the second category.

13. The method of claim 12, wherein performing the comparison comprises:

performing a first comparison between the first similarity and the first similarity threshold;

performing a second comparison between the second similarity and the second similarity threshold; and determine a match accuracy based on the first comparison and the second comparison.

14. A system comprising:

a storage device; and one or more processors communicatively coupled to the storage device storing instructions thereon, that cause the one or more processors to:

receive a request for data over a time period;

generate a first plurality of tokens by causing the system to:

input, into an artificial intelligence (AI) model, the user prompt to cause the AI model to generate an output based on the user prompt; and generate the first plurality of tokens based on the output;

generate a second plurality of tokens by causing the system to:

retrieve, based on the user prompt, a plurality of sources relating to the data requested by the user prompt;

generate a plurality of queries to request, from the plurality of sources, the data over the time period; and generate the second plurality of tokens based on the data over the time period;

perform a comparison of the first plurality of tokens and the second plurality of tokens;

based on the comparison, flag the output of the AI model as an anomaly; and provide feedback to the generative model indicating one or more reasons for flagging the output of the AI model as the anomaly.

15. The system of claim 14, wherein, to perform the comparison, the instructions further cause the one or more processors to:

determine, based on the comparison, a match accuracy between the first plurality of tokens and the second plurality of tokens; and determine whether the match accuracy satisfies an anomaly detection threshold, wherein, to accept or reject the output of the AI model based on the comparison, the instructions further cause the one or more processors to accept or reject the output based on whether the match accuracy satisfies the anomaly detection threshold.

16. The system of claim 14, wherein, to generate the first plurality of tokens, the instructions further cause the one or more processors to tokenize the output to extract a first plurality of keywords within the output.

17. The system of claim 14, wherein, to generate the second plurality of tokens, the instructions further cause the one or more processors to tokenize the data over the time period to extract a second plurality of keywords within the data over the time period.

18. The system of claim 14, wherein, to perform the comparison, the instructions further cause the one or more processors to compare a first plurality of keywords extracted from the output and a second plurality of keywords extracted from the data over the time period.

19. The system of claim 18, wherein the instructions further cause the one or more processors to:

determine a first category of keywords for which a first similarity between a first subset of keywords of the first plurality of keywords and a second subset of keywords of the second plurality of keywords must satisfy a first similarity threshold, the first subset of keywords and the second subset of keywords belonging to the first category; and determine a second category of keywords for which a second similarity between a third subset of keywords of the first plurality of keywords and a fourth subset of keywords of the second plurality of keywords must satisfy a second similarity threshold, the third subset of keywords and the fourth subset of keywords belonging to the second category.

20. The system of claim 19, wherein, to perform the comparison, the instructions further cause the one or more processors to:

perform a first comparison between the first similarity and the first similarity threshold;

perform a second comparison between the second similarity and the second similarity threshold; and determine a match accuracy based on first comparison and the second comparison.

\* \* \* \* \*